United States Patent
Carver et al.

(10) Patent No.: US 11,520,777 B2
(45) Date of Patent: Dec. 6, 2022

(54) HIGH PERFORMANCE DISTRIBUTED SYSTEM OF RECORD WITH EXTENDED TRANSACTION PROCESSING CAPABILITY

(71) Applicant: Akamai Technologies, Inc., Cambridge, MA (US)

(72) Inventors: David C. Carver, Lexington, MA (US); Leen Al Shenibr, Brookline, MA (US); William R. Sears, Lexington, MA (US); Vladimir Shtokman, Newton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/916,464

(22) Filed: Jun. 30, 2020

(65) Prior Publication Data
US 2021/0182277 A1    Jun. 17, 2021

Related U.S. Application Data

(60) Provisional application No. 62/949,032, filed on Dec. 17, 2019.

(51) Int. Cl.
*G06F 16/00*     (2019.01)
*G06F 16/23*     (2019.01)
(Continued)

(52) U.S. Cl.
CPC ...... *G06F 16/2379* (2019.01); *G06F 16/2228* (2019.01); *G06F 16/27* (2019.01);
(Continued)

(58) Field of Classification Search
CPC .. G06F 16/2228; G06F 16/2379; G06F 16/27; G06Q 20/065; G06Q 20/202;
(Continued)

(56) References Cited

U.S. PATENT DOCUMENTS 10,250,708 B1    4/2019 Carver et al.
10,630,769 B2    4/2020 Carver et al.
(Continued)

FOREIGN PATENT DOCUMENTS

WO    2021/048663    10/2021

OTHER PUBLICATIONS

PCT/US2020/065511, International Search Report and Written Opinion, dated Mar. 26, 2021.
(Continued)

*Primary Examiner* — Vincent F Boccio
(74) *Attorney, Agent, or Firm* — David H. Judson

(57) ABSTRACT

A set of transaction handling computing elements comprise a network core that receive and process transaction requests into an append-only immutable chain of data blocks, wherein a data block is a collection of transactions, and wherein an Unspent Transaction Output (UTXO) data structure supporting the immutable chain of data blocks is an output from a finalized transaction. Typically, the UTXO data structure consists essentially of an address and a value. In this approach, at least one UTXO data structure is configured to include information either in addition to or in lieu of the address and value, thereby defining a Transaction Output (TXO). A TXO may have a variety of types, and one type includes an attribute that encodes data. In response to receipt of a request to process a transaction, the set of transaction handling computing elements are executed to process the transaction into a block using at least the information in the TXO.

19 Claims, 15 Drawing Sheets

(51) Int. Cl.
*H04L 9/32* (2006.01)
*G06F 16/22* (2019.01)
*H04L 67/10* (2022.01)
*G06Q 20/36* (2012.01)
*H04L 9/08* (2006.01)
*H04L 9/30* (2006.01)
*G06F 16/27* (2019.01)
*G06Q 20/40* (2012.01)
*G06Q 30/02* (2012.01)
*G06Q 20/20* (2012.01)
*H04L 9/00* (2022.01)

(52) U.S. Cl.
CPC ......... *G06Q 20/367* (2013.01); *G06Q 20/409* (2013.01); *G06Q 30/0226* (2013.01); *H04L 9/0891* (2013.01); *H04L 9/30* (2013.01); *H04L 9/3247* (2013.01); *H04L 67/10* (2013.01); *G06Q 20/202* (2013.01); *G06Q 20/36* (2013.01); *G06Q 20/405* (2013.01); *H04L 9/50* (2022.05)

(58) Field of Classification Search
CPC .... G06Q 20/36; G06Q 20/363; G06Q 20/367; G06Q 20/3825; G06Q 20/3829; G06Q 20/389; G06Q 20/401; G06Q 20/405; G06Q 20/409; H04L 67/10; H04L 67/104; H04L 67/0891; H04L 67/30; H04L 67/3239; H04L 67/3247

USPC ........................................................ 707/703
See application file for complete search history.

(56) References Cited

U.S. PATENT DOCUMENTS

| | | | |
|---|---|---|---|
| 2009/0031310 A1* | 1/2009 | Lev ........................ | G06F 9/466 718/101 |
| 2019/0057382 A1* | 2/2019 | Wright .................. | H04L 9/3242 |
| 2019/0080392 A1* | 3/2019 | Youb ...................... | G06F 21/64 |
| 2019/0199515 A1 | 6/2019 | Carver et al. | |
| 2019/0220324 A1 | 7/2019 | Carver et al. | |
| 2019/0279197 A1 | 9/2019 | Wright et al. | |
| 2019/0303887 A1 | 10/2019 | Wright et al. | |
| 2020/0242593 A1* | 7/2020 | Deshpande ........ | G06Q 20/0655 |

OTHER PUBLICATIONS

Matzutt, et al. "A Quantitative Analysis of the Impact of Arbitrary Blockchain Content on Bitcoin," 22nd International Conference on Financial Cryptography and Data Security, Mar. 2018.

Dryja, "Utreexo: A dynamic hash-based accumulator optimized for the Bitcoin UTXO set" Cryptology ePrint Archive: Report 2019/611, Version: 20190605:153040, Jun. 2019.

\* cited by examiner

| INPUTS | | | | | OUTPUTS | | |
|---|---|---|---|---|---|---|---|
| SIGNATURE | Txid | Ix | dnc | | ADDRESS | VALUE | ATTRIBUTES |
| SIGNATURE | Txid | Ix | dnc | [DATA/SIG] | ADDRESS | VALUE | ATTRIBUTES |
| SIGNATURE | Txid | Ix | dnc | | ADDRESS | VALUE | ATTRIBUTES |

TRANSACTION (spanning header over INPUTS and OUTPUTS)

FIG. 13

ITXO

| COLLISION KEY | ExpiryBCTime | TXID |
|---|---|---|
| 16/32/N | 8 | 32 |

FIG. 14

TXO

| KEY | DATA |
|---|---|
| 16/32/N | VARIABLE |

FIG. 15

HIGH PERFORMANCE DISTRIBUTED SYSTEM OF RECORD WITH EXTENDED TRANSACTION PROCESSING CAPABILITY

BACKGROUND

Technical Field

This application relates generally to managing a distributed system of record across a set of computing resources in a distributed network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

A blockchain is a continuously growing list of records, called blocks, which are linked and secured using cryptography. Each block typically contains a cryptographic hash linking it to a previous block, and transaction data. For use as a distributed ledger, a blockchain typically is managed by a peer-to-peer network collectively adhering to a protocol for validating new blocks. Once recorded, the data in any given block cannot be altered retroactively without the alteration of all subsequent blocks, which requires collusion of the network majority. Blockchains are suitable for the recording of events, various records management activities (such as identity management, transaction processing, documenting provenance, etc.) and others. Generalizing, a blockchain is a decentralized, distributed and digital ledger that is used to record transactions across many computers so that the record cannot be altered retroactively without the alteration of all subsequent blocks and the collusion of the network. In a typical blockchain, blocks hold batches of valid transactions that are hashed and encoded into a data structure. In this structure, and as noted above, each block includes the cryptographic hash linking it to the prior block in the blockchain. The linked blocks form a chain. This iterative process confirms the integrity of the previous block, all the way back to the original genesis (or first) block.

Blockchain implementations may be used to support a variety of application areas, some of which have elevated security requirements. In known systems, such as Bitcoin, Etherium and their derivatives, a main focus is on securing the private keys that are used by wallets (namely, to spend value associated with the wallet). In addition, wallet security continues to be an important consideration in the design and implementation of such systems, and there are also a set of extended use cases, e.g., hosted or server-based wallets, server based co-signing or multiple signature-based transactions, and administrative management of accounts and associated value, that present additional security challenges. In particular, these capabilities offer significant benefits, but they may also increase the attack surface, i.e., the number of and paths of potential compromise.

BRIEF SUMMARY

This disclosure provides for a high performance distributed ledger and transaction computing network fabric over which large numbers of transactions (involving the transformation, conversion or transfer of information or value) are processed concurrently in a scalable, reliable, secure and efficient manner. In one embodiment, the computing network fabric or "core" is configured to support a distributed blockchain network that organizes data of the blockchain in a manner that allows communication, processing and storage of blocks of the chain to be performed concurrently, with little synchronization, at very high performance and low latency, even when the transactions themselves originate from remote sources. This data organization relies on segmenting a transaction space within autonomous but cooperating computing nodes that are configured as a processing mesh. Each computing node typically is functionally-equivalent to all other nodes in the core, and preferably each node can carry the entire load of the system. A computing node typically comprises a cluster of computing, communications and storage elements. More generally, all computing nodes that comprise the core network preferably are considered to be equal to one another, and no individual node, standing alone, is deemed to be trustworthy. Further, with respect to one another, the nodes operate autonomously, and preferably no node can control another node. The nodes operate on blocks independently from one another while still maintaining a consistent and logically complete view of the blockchain as a whole.

In the approach described above, a set of transaction handling computing elements comprise a network core that receive and process transaction requests into an append-only immutable chain of data blocks (the blockchain), wherein a data block is a collection of transactions, and wherein an Unspent Transaction Output (UTXO) data structure supporting the immutable chain of data blocks is an output from a finalized transaction. Typically, the UTXO data structure consists essentially of an address and a value. According to this disclosure, at least one UTXO data structure is configured to include information either in addition to or in lieu of the address and value, thereby defining a Transaction Output (TXO). A TXO may have a variety of types and a particular type may include an attribute that encodes given data to facilitate the operation of the applicable business logic that is executing to process transactions into the chain. In response to receipt of a request to process a transaction, the set of transaction handling computing elements are executed to concurrently process the transaction into a data block using at least the information in the TXO.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 13 depicts a representative RTXO data structure;

FIG. 14 depicts a representative ITXO data structure;

FIG. 15 depicts another TXO data structure according to this disclosure;

DETAILED DESCRIPTION

Overall High Level Design

Figure 1:
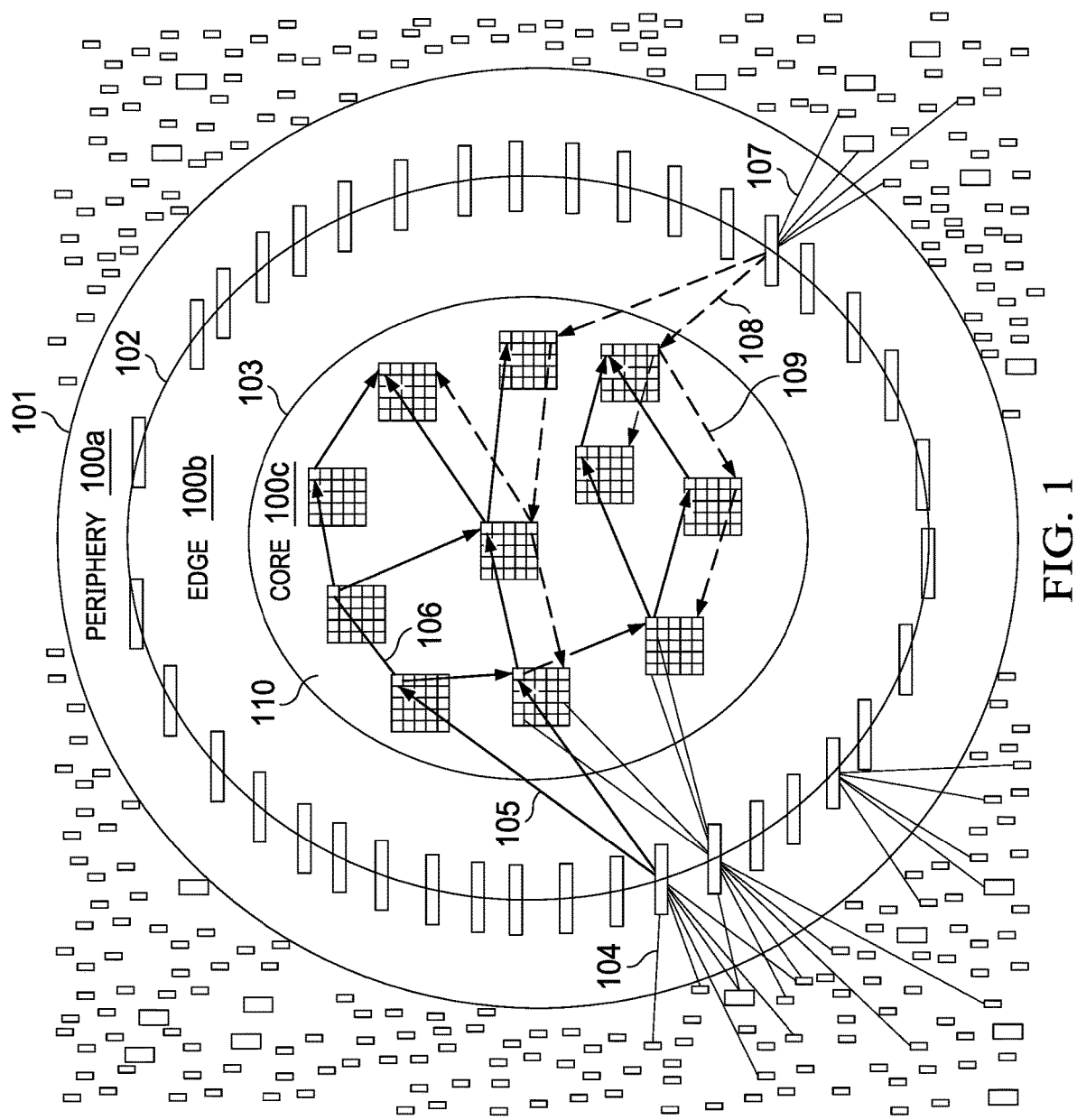
FIG. 1 is a block diagram illustrating a networking architecture that provides a distributed system of record with transactions organized into a blockchain according to this disclosure.

FIG. 1 depicts a scalable, high performance architecture for implementing a distributed system of record with transactions organized into a blockchain. At a high level, the system is divided into multiple functional areas as shown, namely, a periphery 100a, an edge 100b, and a core 100c. The system may comprise other functional areas to facilitate delivery, administration, operations, management, configuration, analytics, and the like, but for simplicity these areas are not depicted. As used herein, the periphery 100a refers generally to elements associated with a boundary 101. These elements typically include client-server based electronic wallets or wallet devices, terminal and point of sale devices, legacy financial network elements and associated adapters. Generally, and as used herein, any element involved with creating and consuming transactions including, without limitation, financial transactions, may be an element in the periphery 101. The periphery may extend globally. The edge 100b typically refers to the elements of an overlay network associated with boundary 102. Representative elements include, without limitation, the processing, communication and storage elements (edge servers, switches/routers, disks/SSDs) running on an overlay edge network (e.g., a CDN such as Akamai®). A CDN such as described advantageously provides low latency points of presence (relative to the end users/devices) that aggregate and, as will be described, route requested transactions and their associated results (to and from elements in the periphery) efficiently. Wallet services may be located within the edge. The edge elements also act individually, collectively, and in conjunction with other services as a security perimeter protecting the core 100c from attacks and other adversarial activity. While a CDN-specific implementation is preferred, a typical edge network in the system herein need not be limited to a CDN edge network. Any suitable network, new or extant, could be used including, without limitation, cloud-based systems.

The core 100c refers to elements associated with boundary 103. As will be described, preferably the core 100c is a high performance network of nodes that together support the processing and storage of transaction blockchain(s) meeting specified performance requirements including, but not limited to, throughput, response time, security and data integrity. A node (sometimes referred to as a "computing node") in this context typically is a cluster of computing, communications, and storage elements. More generally, a cluster as used herein refers to one or more, and possibly many, computing, communications, and storage elements. In one embodiment, the core 100c comprises overlay network nodes, although this is not a requirement, as the core 100c may comprise a set of nodes distinct from the CDN and dedicated to the core operations (as will be described). Typically, computing nodes are interconnected by network transits and have a high degree of interconnectivity to reduce or eliminate topological bottlenecks.

To facilitate high performance, preferably the core network is constructed using a high quality, high capacity, and diverse interconnect. The particular configuration of the core network typically is implementation-dependent, at least in part based on the nature of the consensus protocol that is implemented in the blockchain. Depending on the consensus protocol used, the size of the core network (and/or the distribution of various computing nodes therein) may also be constrained as necessary to ensure sufficiently low latency network communications across the core.

In one non-limiting implementation, the CDN edge 100b supports a globally-based service having associated therewith a core network 100c (e.g., that is located across a plurality of networked data centers in a given geography).

Referring again to FIG. 1, message 104 is an example of a device (e.g., an end user device, an electronic wallet, etc.) sending a transaction request to an edge server (e.g., such as a CDN edge server). It should be appreciated that a multitude of such messages (and that will be sent to and processed by the core network as described herein) are expected to originate from server, devices, and wallets worldwide. The messages may be transmitted over persistent connection or ephemeral connections, as well as via new or extant networks where those networks may be part of legacy or network infrastructure purpose built to natively support the system capabilities described herein. Further, messages may be sent to one or more edge servers to reduce reliance on any single point of ingress to the system.

Message 105 is an example of an edge element routing transactions (possibly including the one contained in message 104) to an appropriate element in a core node 110 (a set of which nodes 110 are depicted). For a given transaction there may be multiple messages 105 that route the same transaction or a hash (or other digest) of the same transaction to the appropriate element in other core nodes. It is not required that all messages 105 contain a full representation of a transaction. A digest of a transaction may be transmitted (1) to make core elements aware of the existence of a transaction, and (2) to provide a robust way to check the integrity of messages containing full transactions. This enables complete, yet efficient, propagation of incoming transaction messages to the appropriate elements in all core nodes. It also greatly reduces the network loading associated with traditional gossip protocols and yet provides protection, e.g., from compromised edge elements censoring or corrupting transactions.

Message 106 is an example of a core node element routing transactions to the appropriate element in another core node. There may be multiple messages 106, such that a core node element participates in propagating transactions or transaction digests across the core nodes of the system. Core nodes receiving message 106 may, in turn, generate other messages 106, further propagating the messages across the core nodes of the system.

Topology-Aware Data Propagation

While any data propagation protocol may be employed, one preferred approach herein is to improve upon cost and latency of traditional randomized peer-to-peer gossip protocols by shaping the propagation to the underlying network topology. In concert, messages 104, 105, and 106 comprise paths of propagation starting with topologically most proximate elements and reaching topologically less- or least-proximate elements. A device that sends messages 104 to other edge elements typically follows different paths of propagation across the network. This is illustrated by the messages 107, 108, and 109 propagating in a different direction. Further, the path of propagation starting from a given device, in general, may change over time to achieve proper load balancing and security.

Service Discovery and High Performance Mapping

Again referring to FIG. 1, before any messages are sent, each element originating a message typically must discover the address of the receiving element. An address may be an Internet Protocol (IP) address or some other name or number in an address space in some type of network (e.g., peer-to-peer network or overlay network). Discovering the address of another element can be achieved in a variety of ways but generally involves sending a set of element attributes to a discovery service and receiving address information in return. In one embodiment that is preferred, the attributes of the system elements to be discovered are encoded as domain names, thereby allowing the system to use a CDN's high performance domain name lookup services to return the necessary address information. Using an overlay network's mapping technology offers several advantages. It supports large domain name spaces to enable even the largest scale deployments. This enables an edge element, for example, to route transactions not just to a core node, but even to specific elements in the core node that handles the associated portions of the transactions' identifier space. This same type of fine-grained routing can be done for communications between core node elements; in particular, and using CDN DNS services, an element in one node handling a set of segments, partitions, or other groupings of transaction information can send messages directly to elements in other core nodes that handle the same segments, partitions, or other groupings of transaction information. This is advantageous because although traffic may traverse a common set of low level network routers/switches, the core nodes need not inspect and route each transaction individually. The use of the CDN name services in this manner also supports reconfiguration. In particular, when a node's configuration changes, for example, because responsibility for some portion of the transaction space is transitioned from one server to another, the changes are quickly and efficiently communicated via the name service's mapping system. Another advantage of using the CDN name services supports the notion of suspension. Thus, in the event an edge element or core node element becomes impaired or inoperative, the mapping system can map traffic away from the problem. A further advantage of using the CDN name service is the ability of such systems to support load balancing of traffic based on high resolution capacity consumption measurements. This approach also supports route and region diversity, such that a device in the periphery may receive addressing information for edge elements that share minimal underlying service and network components. CDN DNS services also support latency optimization. For example, core node elements may receive addresses for other core node elements that meet some proximity criteria.

An alternative embodiment utilizes location or direction-aware mapping. Thus, for example, a core node element may use domain names encoded with location or direction information (either geographic or topological direction) such that responses provide addresses to node elements that are in a desired location or direction or that comprise a directional graph. This capability may be intrinsic to the mapping system or an adjunct thereto. Topological mapping in this manner provides for a low latency, topology aware data propagation mechanism.

Generalizations

As used herein, a block generally refers to any aggregation or association of transaction data. There is no specific format required. A blockchain is a continuously growing list of records, called blocks, that are linked and secured using cryptography. Each block in a blockchain typically contains a cryptographic hash linking to the previous block, and transaction data. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

While the techniques herein may use a blockchain to record transaction data, this is not a limitation, as the architecture and associated transport mechanism of this disclosure system is also applicable to other organizations of transaction data. Moreover, the notion of a blockchain, as in a chain or sequence of blocks, may be any organization of blocks including, without limitation, a block tree, a block graph, or the like.

Mining is the act of generating an ordered block of transactions with a header that references a previous block in the blockchain. In public (permissionless) blockchain consensus systems, mining generally is structured as a competition; if a generated block (and its ancestors) survive the mining competition and subsequent consensus process, it is considered finalized and part of the permanent record. In an ideal system, mining responsibility from one round to the next (i.e., from one block to the next) is randomly-dispersed across participants. Formally, in an ideal system, mining decisions are not predictable, not capable of being influenced, and are verifiable. In real world applications, however, the dispersion need not be perfectly random. For example, in proof-of-work systems, the dispersion is not actually random, as entities with more mining power have a higher probability of winning the competition.

Segmentation

Traditional blockchain implementations treat the blockchain as a simple sequence of blocks. Such approaches severely limit the achievable performance of blockchain implementations, typically by creating bottlenecks in processing, communicating and storing the blockchain in its aggregate form.

In contrast, the approach described here departs from known techniques by organizing the data of a single chain in a manner that allows its communication, processing and storage to be performed concurrently, with little synchronization, at very high performance. Preferably, and as will be seen, this data organization relies on segmenting the transaction space within each node while maintaining a consistent and logically complete view of the blockchain. This approach may also be applied to each of multiple chains that comprise a set of federated or sharded blockchains, and to improve the performance of the blockchain operation thereby reducing the work and increasing the performance of off-chain (so-called "Layer-2") systems.

In this approach, the consensus algorithm that spans the network is used to ensure the system produces correct finalized results. The particular consensus algorithm(s) that may be used are not a limitation. Operations within each node, however, assume the elements of the node are correct and trustworthy. If a node fails or is corrupted by an adversary, the system relies on the rest of the network to maintain service integrity and availability as well as to support failure and intrusion detection functions. As will be seen, this design architecture enables the internals of a node to be organized as a loosely-coupled distributed system running on a high performance, low latency communications fabric such that system elements are aligned with the blockchain data organization. The resulting architecture provides a much higher performance implementation as compared to known techniques.

Block Segmentation

Figure 2:
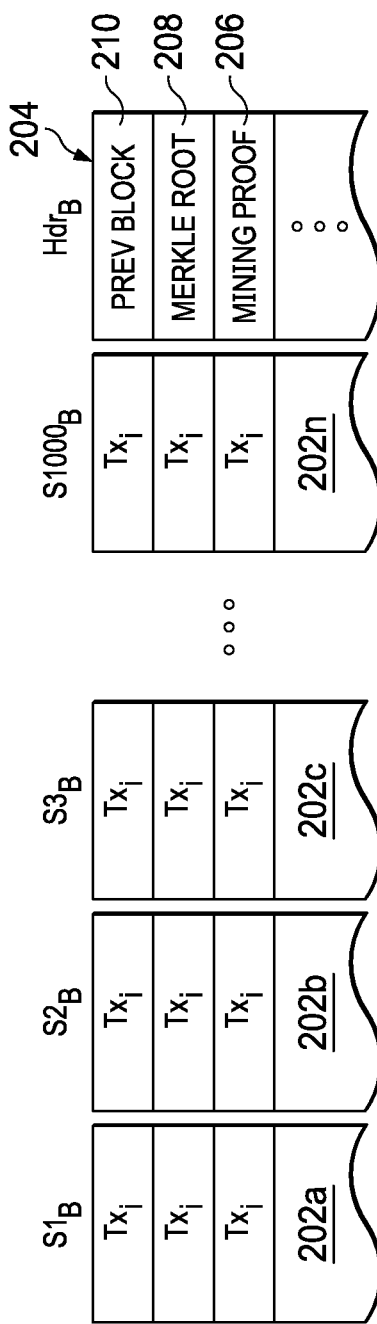
FIG. 2 depicts a block segmentation according to the technique herein.

Referring to FIG. 2, a block 200 is segmented by transaction id ($Tx_i$) into some number of segments 202a-n, where n=1000, and a header 204. The segments 202 and header 204 represent a block of the blockchain although they may be (and often are) processed, transmitted and stored separately. The number of segments 202, shown in FIG. 2 as 1000, may be more or fewer in number and may change over time or dynamically. Preferably, a sufficient number of segments is selected to create a space that is large enough to enable substantial future growth of the underlying resources without having to change the segmentation (the organization) of the data.

In this embodiment, block segmentation typically is an externally visible attribute shared by all nodes of the network. As will be seen, organizing the block data by segment significantly improves the performance and efficiency of nodes exchanging block information. In particular, the approach herein enables the components of a node responsible for handling a given segment to communicate directly with the components of other nodes responsible for handling the given segment. Moreover, the mapping of segments to components may differ across nodes, thereby allowing for scaled-up (or scaled-down) deployments, e.g., by allowing nodes to employ a different number of resources in handling the overall amount of transaction data.

In an alternative embodiment, the details of the segmentation may remain strictly a node internal attribute. In such an embodiment, the mapping of segments to the components of a node may be arbitrary. This alternative allows greater independence in the configuration of nodes, but it generally requires more granular (e.g., transaction-by-transaction) exchange of data between nodes involving some form of transaction layer routing inside the nodes.

As used herein, the term segmentation is used to mean any grouping, partitioning, sharding, etc. of transaction data, whether implicit or explicit, such that the elements of one node may interact with elements in another node to exchange data for more than one transaction at a time.

A header 204 includes several required elements, namely, a hash 210 of the previous block header, a Merkle root 208 of the block's contents, and a proof 206 indicating that a miner of the block in fact was a legitimate miner. Other information may be included.

Blockchain Segmentation

Figure 3:
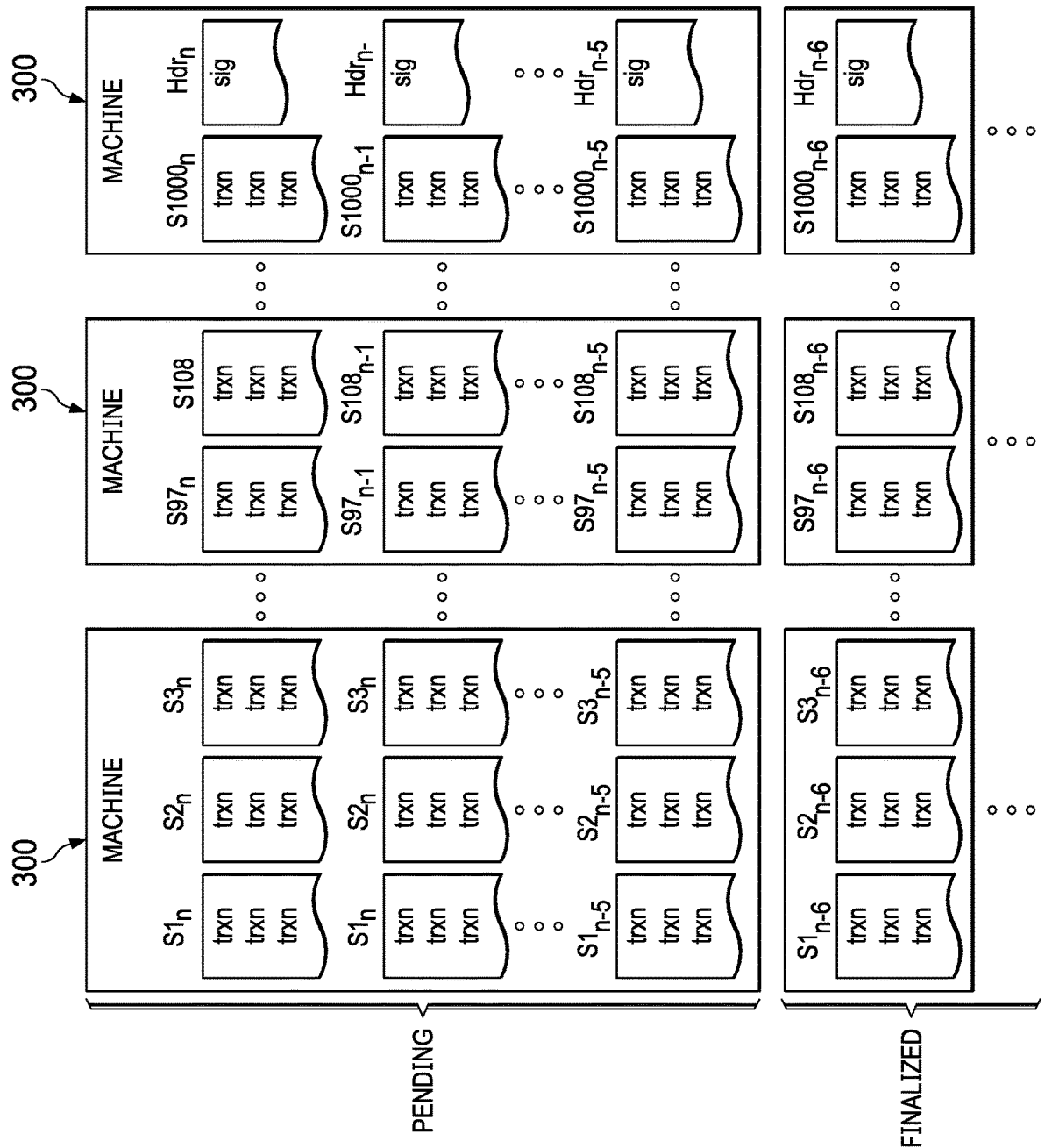
FIG. 3 depicts a segmented blockchain.

Referring to FIG. 3, the segmented blocks form, temporally, a segmented blockchain, with some blocks thereof pending (i.e., not yet finalized), while other blocks thereof are finalized (i.e., added to the blockchain). In this example, each machine 300 as depicted supports both pending and finalized blocks, although this is not a requirement. This distributed organization is not limited to a block "chain," as the approach may also be applicable in other scenarios, such as with respect to a block tree or block graph structure. The approach is advantageous because the blocks are still whole but the segments thereof are processed more efficiently than processing a block monolithically. As depicted in FIG. 3, a varying number of segments may be assigned to different machine resources and commingled. This type of organization is particularly applicable to virtualized and containerized environments, although neither are required to achieve the benefits.

Figure 4:
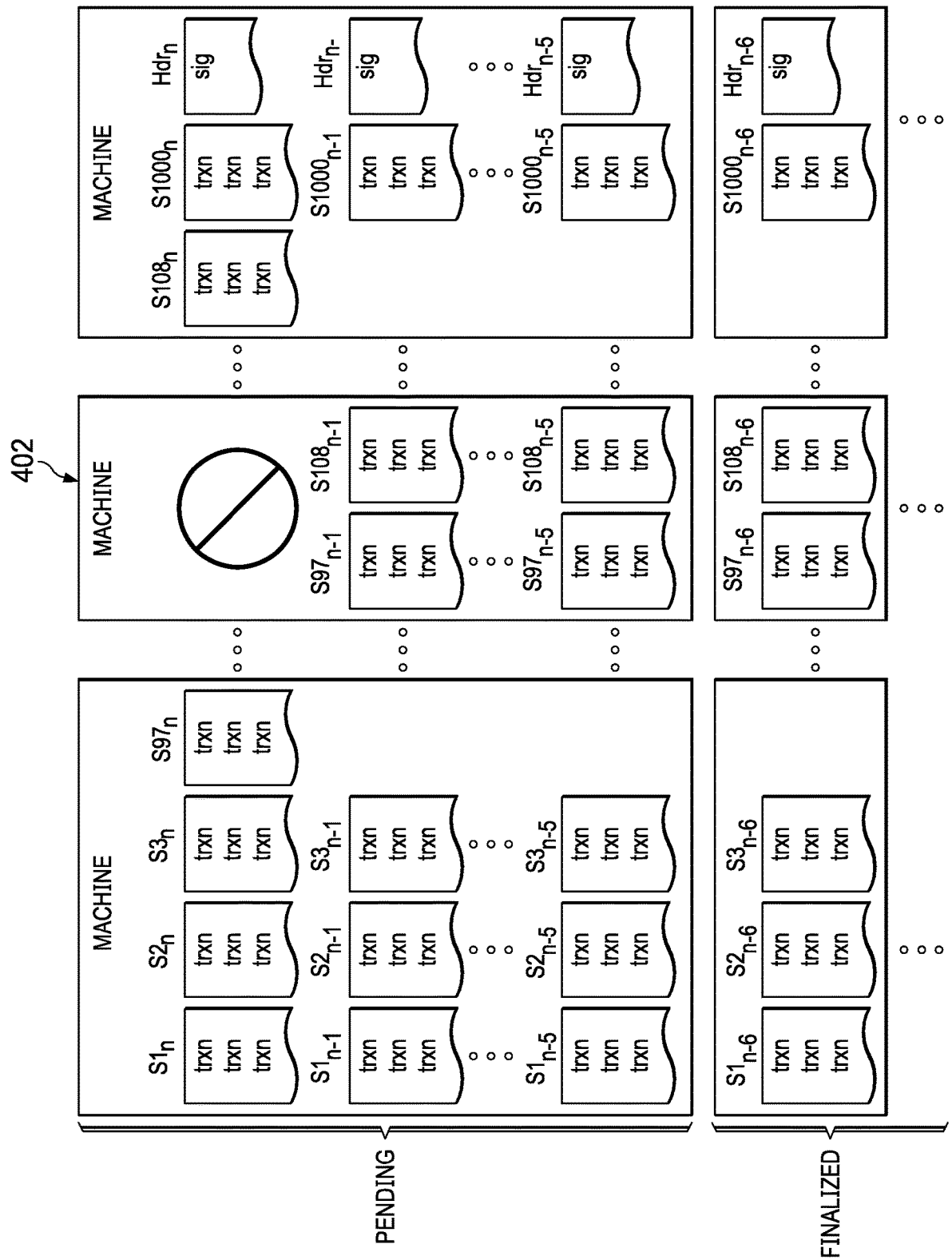
FIG. 4 depicts a segment migration and reassignment process.

Referring to FIG. 4, the assignment of segments to system resources may vary over time, for example, to support upgrades, maintenance and failure recovery. In this case, one machine 402 failed or was taken off line, and the segments it was handling are then migrated to other machines. This approach fits well with established concepts of migrating virtual or containerized computing elements both for routine and emergent reasons.

Segmentation and Inter-Node Communication

Figure 5:
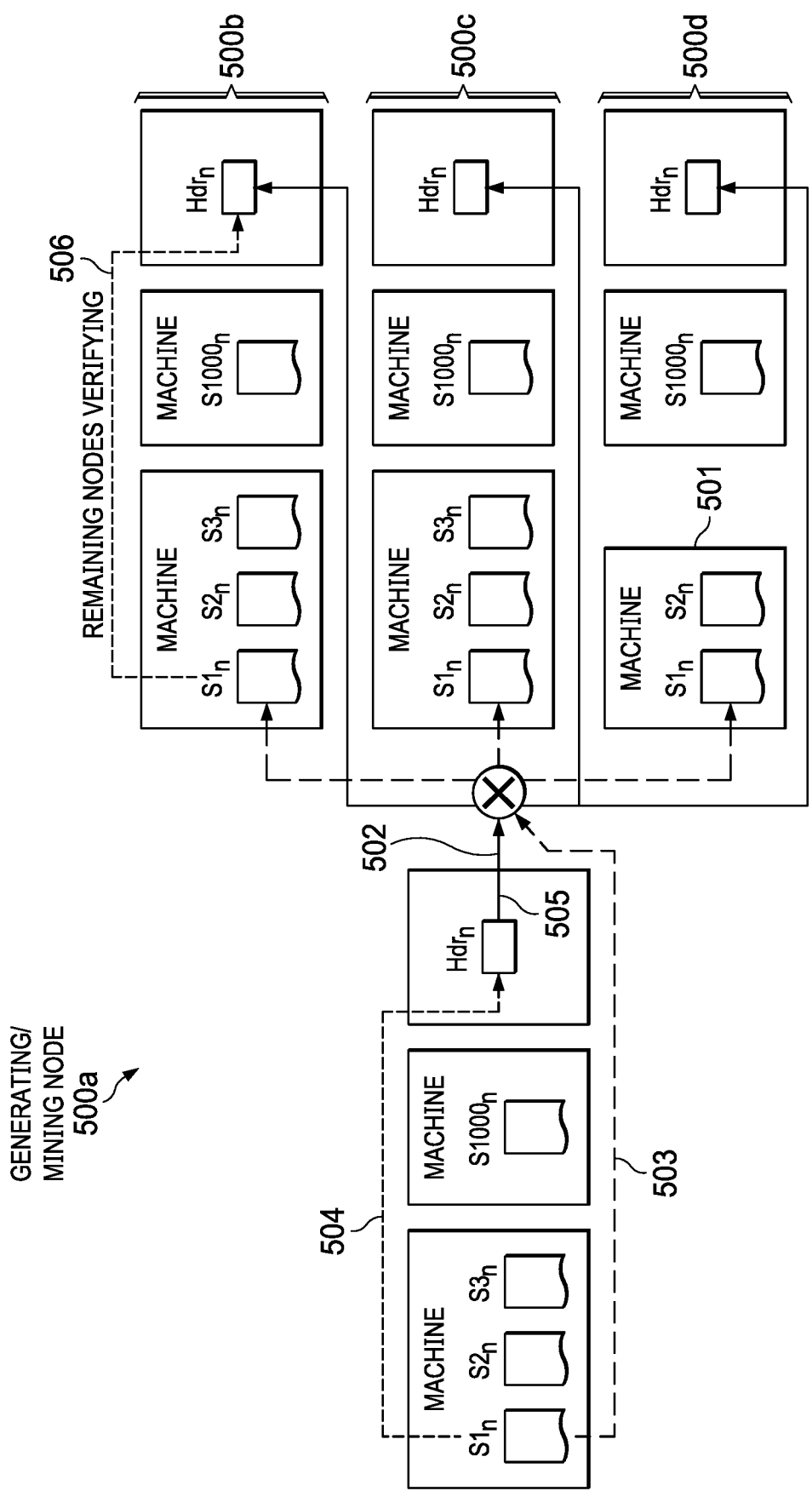
FIG. 5 depicts an inter-node segment handling process of this disclosure.

Referring to FIG. 5, by making segmentation a publicized attribute of a node, elements within a node may communicate directly with elements in other nodes to exchange information on the granularity of a segment. The mapping of segments to nodes need not be the same across all nodes.

As will be described, in a preferred embodiment the computing nodes of the system are each capable of performing (and often do perform) multiple distinct functions or modes (operating roles) such as transaction validation, as well as block mining and verification. Indeed, a given computing node often operates in multiple such modes at the same time. In a typical operating scenario, particular nodes may be used for mining, although typically all computing nodes verify what is mined.

FIG. 5 illustrates how orchestration of block mining and block verification preferably is accomplished in the presence of segmentation. In this example, it is assumed that there are a number of machines that are used for generating/mining the block in the computing node 500a, while other computing nodes 500b, 500c and 500d comprise machines that verify the block (referred to herein as "verification"). As depicted, a block mining event is initiated by message 502 sent by a mining node 500a (generally by the element that handles the generation and validation block headers) to the other nodes of the network (in this example, nodes 500b, 500c and 500d) informing them that it is about to begin mining or generating a block. Corresponding elements in nodes 500b, 500c and 500d receive this message and inform their node's processing elements to expect mined block data from elements in the mining node. At the same time, multiple sequences of messages like 503 are sent for each generated segment by the elements in the mining node handling those segments to the elements handling each segment in remote verification nodes (respectively).

Once a mined segment is finished, message 504 is sent from the element responsible for that segment to the element responsible for the block header. The message includes, among other things, the Merkle root of the generated segment. Once all messages 504 are sent and received, the element responsible for the block header creates the top of the block Merkle tree and saves the Merkle root in the header. It then transmits messages 505 to the elements in the other nodes responsible for handling header generation and verification. In performing validation, and upon receiving messages 503 for a segment, the receiving node element handling the segment validates the received transactions, computes the segment's Merkle tree, and upon completion sends message 506 to the element in the node handling the header. That element reconstructs the block header from the messages 506 for all segments and compares it to the header received from the mining node in message 505. If the headers match, the block is accepted and added to the set of pre-finalized blocks in that node.

In one embodiment, if the transactions fail to verify or the reconstructed header does not match the header transmitted from the mining node, the block is rejected, and all changes are reverted and expunged from the node.

In another embodiment, validating nodes can flag machines that mine to a different value of message 506 for the same segment, thereby safeguarding the system from one or more faulty or malicious machines.

The above-described processing is described in more detail below.

Segmentation and Node Orchestration

Figure 6A:
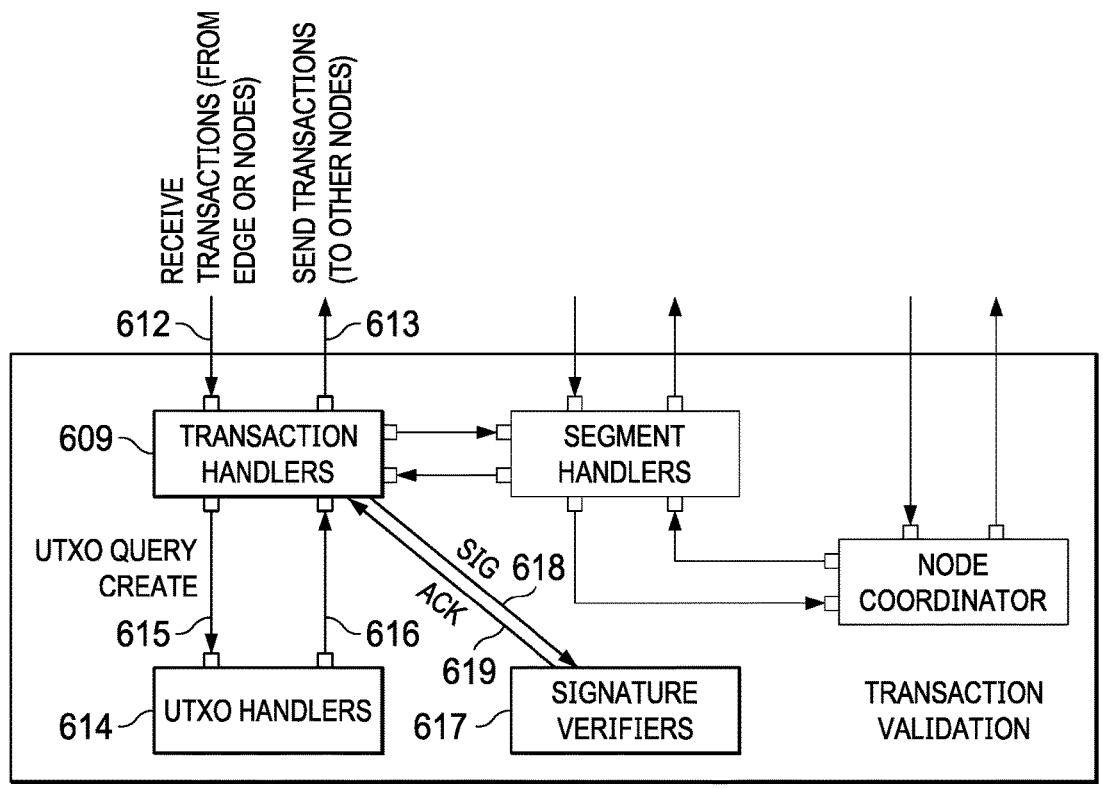
FIG. 6A depicts a representative computing node block diagram and its operation while performing transaction validation.
Figure 6B:
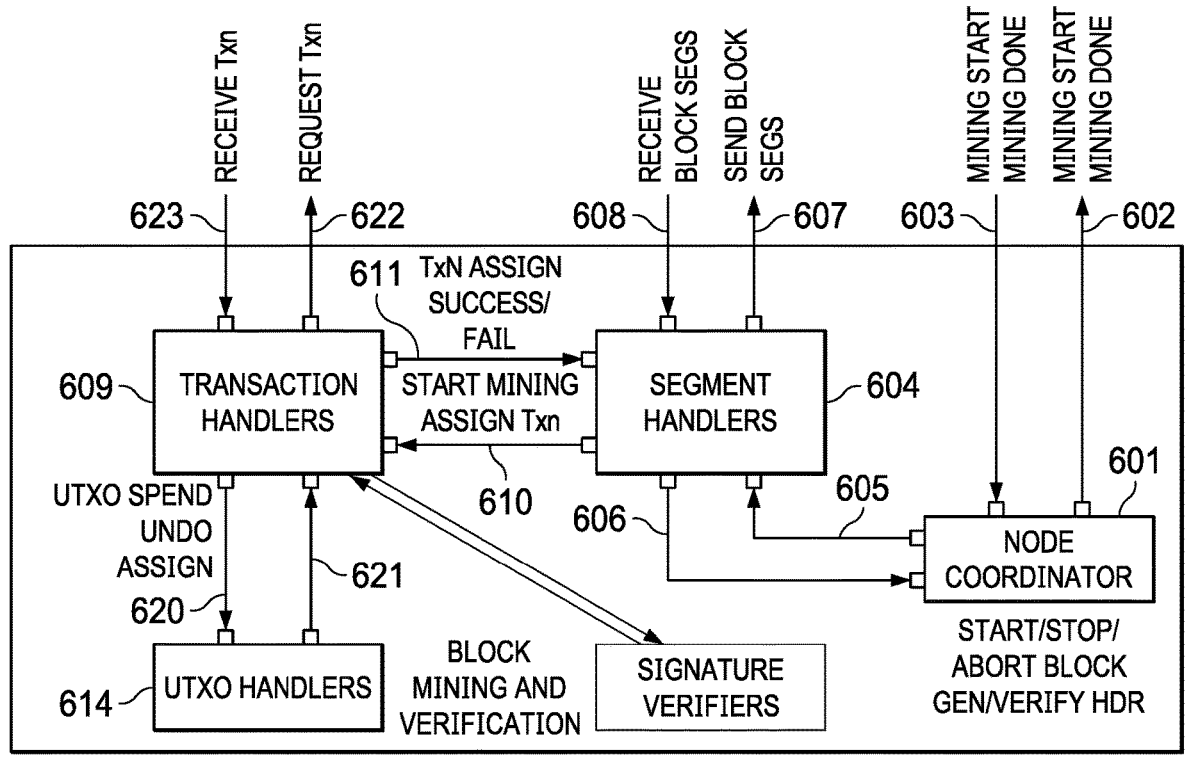
FIG. 6B depicts the computing node of FIG. 6A and its operation while performing block mining and verification.

FIG. 6A and FIG. 6B depict the operation of a computing node of the system, with FIG. 6A showing the operation of the node elements involved with initial transaction validation, and FIG. 6B showing the operation of the node elements involved with block mining and verification.

As depicted in FIGS. 6A and 6B, a node comprises several elements or components that work together to perform separately scalable tasks associated with transaction validation as well as block mining and verification. These components include node coordinator 601, a set of segment handlers 604, a set of transaction handlers 609, a set of UTXO (Unspent Transaction Output) handlers 614, and a set of signature verifiers 617. While segment and transaction handlers are shown as distinct (and this is preferred), these functions can be combined into a composite handler that performs both functions as will be described. Further, while typically there are a plurality of instances of each handler, one may suffice depending on its processing capability.

By way of background, and as noted above, preferably each node is functionally-equivalent to all other nodes in the system, and each node carries the entire load of the system. More generally, all nodes in the system are considered to be equal to one another and no individual node, standing alone, is deemed trustworthy. Further, with respect to one another, the nodes operate autonomously, and no node can control another node.

A node operates in general as follows. For transaction validation, and with reference to FIG. 6A, raw transactions are continuously received at the node at 612, typically as those transactions are forwarded from the edge machines (or from other nodes), and initially processed by the transaction handlers 609. A transaction typically is formulated in a wallet or a set of wallets (e.g., by a wallet service associated therewith or running thereon), and the wallet typically interacts with an edge machine either to receive a transaction request from the periphery or to forward a blockchain transaction to the core, where it is received at 612 and processed by a transaction handler 609. In general, the processing of a raw transaction by a transaction handler is a "validation," and once a raw transaction is "validated" by the transaction handler, the transaction is placed in the transaction handler's memory pool (or "mem pool"). A raw transaction that is not found by the transaction handler to be valid is rejected and not placed in the handler's mem pool.

To this end, upon receipt (i.e. ingress of a raw transaction to the node), the transaction handler 609 typically carries out two basic actions. As depicted in FIG. 6A, the transaction handler 609 queries UTXO handlers 614 (at 615) to determine whether inputs to the transaction exist and, if so, to obtain those inputs (at 616) from the UTXO space being managed by the UTXO handlers 614. If the inputs do not exist, the UTXO handler that receives the query informs the transaction handler, which then rejects the raw transaction. Upon receipt of inputs from the UTXO handler 614, the transaction handler 609 consults a signature verifier 617 (at 618) to determine whether a unlocking script (digital signature) associated with each input is valid. Typically, each input contains an unlocking script (digital signature) of the transaction, and thus the signature verification performed by a signature verifier involves the signature verifier checking that the signature matches the locking script (pubic key) associated with each UTXO consumed by the transaction. Further details regarding this operation are described below. This check thus involves a cryptographic operation and is computationally-intensive; thus, the signature verifier preferably is only consulted by the transaction hander for a valid input received from the UTXO handler. The signature verifier 617 acknowledges the validity of the input (in particular, the input signature) at 619. The transaction handler can interact with the UTXO handler and the signature verifier concurrently as inputs are received by the transaction handler. Once all input signatures are verified by the signature verifier 617, the raw transaction is considered by the transaction handler to the "valid" or "validated," and at 615 transaction handler 609 creates new transactions outputs (UTXOs) in the UTXO handler 614 responsible for UTXOs associated with the new transaction. In this operation, a create request is sent to only one UTXO handler, namely the one handler that handles UTXOs in the portion of the transaction id space associated with the transaction. As also depicted, the create call (at 615) is sent (after a query and signature verifier success) to initiate the new transactions outputs (UTXOs).

Once all inputs are verified in this manner, the raw transaction is then placed in the transaction handler's mem pool. The raw transaction (that has now been validated) is then output (i.e. propagated) to all other nodes via 613, and each other node that receives the raw transaction carries out a similar set of operations as has been just described. This completes the local validate operation for the raw transaction, which as a consequence is now in the transaction handler's mem pool. The above-described process continues as raw transactions are received at the node (once again, either from edge machines or from other nodes).

Thus, a transaction handler that receives a raw transaction determines (from querying the UTXO handler) whether inputs to the transaction exists and, if so, what are their values and locking scripts (containing public keys sometimes referred to as addresses or wallet addresses). It checks each input's unlocking script (digital signature), and if all signatures are valid, the transaction handler commits (saves) the raw transaction to its associated memory pool. In this manner, validated raw transactions accumulate in each handler's mem pool. Thus, in each transaction handler's mem pool there are a collection of transactions in effect "waiting" to be mined (i.e., assigned) to a block segment (and thus a block) in the blockchain. Preferably, the system enforces a minimum wait time to allow the new transactions to propagate and be validated by the other nodes of the system.

Assume now that the node coordinator 601 determines it is time to mine a block into the blockchain. The notion of mining a block is distinct from the notion of actually adding the block to the blockchain, which happens (as will be described in more detail below) when the node coordinator decides a block is final according to a prescribed consensus algorithm of the system. Typically, at any given time there is a subset of the nodes that act as "miners." According to the techniques herein, and as has been described, in lieu of mining a block as a composite, a block is mined in "segments," i.e., individual segments of the block are mined separately (albeit concurrently or in parallel) and, in particular, by the segment handlers 604.

To this end, and with reference now to FIG. 6B, the node coordinator 601 instructs its associated segment handlers 604 to begin mining their segments via 605. This command typically includes a start time, a duration, and an end time. The node coordinator also informs other node coordinators in the system (via 602) to expect mined block segment data to be transmitted directly (via 607) from the mining node's segment handlers to the segment handlers in the other nodes of the system. A segment handler's job is to obtain and receive validated raw transactions from a transaction handler's mem pool, and to stage those validated transactions for eventual persistence in the block segment (and thus the block) if and when the block is finalized and added to the blockchain. In an alternative embodiment, the segment handler may obtain and receive digests (hashes) of validated transactions, in which case the job of staging transactions for future persistence shifts to the transaction handler.

As will be described, preferably the actual persistence of each segment in the block (and the persistence of the block in the blockchain itself) does not occur until the segment handlers are instructed by the node coordinator to finalize a block. Typically, there is a 1:1 relationship between a segment handler 604 and a transaction handler 609, although this is not a limitation. As noted above, these functions may be combined in an implementation and while a 1:1 relationship is depicted, a node could be configured with any number of either type of handler.

Upon receipt of the command to initiate mining, at 610 the segment handler 604 requests the transaction handlers (handling segments for the segment handler) to assign transactions in their respective mem pools to the block and return each raw transaction (or a hash thereof). Before the transaction handler returns a raw transaction from its mem pool to the requesting segment handler, however, the transaction handler must first "spend" the transaction inputs with respect to the block being mined (i.e., apply the actual transaction values to the inputs), which it does by sending spend requests (via 620) to the UTXO handlers; as depicted, the UTXO handlers apply the spend requests, update their local data, and return the result (success or failure) to the transaction handler (via 621).

In the event of a failure response, the transaction handler must instruct the UTXO handlers via 620 to undo all successful spend operations for the transaction. This collision detection and rollback constitutes an optimistic concurrency control mechanism that obviates, and thus avoids the high costs of, acquiring a lock (or a distributed lock in the case of a node with multiple UTXO handlers) on the UTXO handler(s). This enables efficient high throughput, low latency handling of UTXO spend operations.

Upon successfully spending all the transaction inputs, the transaction handler instructs a UTXO handler via 620 to assign the transaction outputs (the transaction's UTXOs) to the block, and it forwards via 611 the raw transaction (and/or a digest thereof) back to the requesting segment handler.

The segment handler-transaction handler interactions here as just described are carried on as the transaction handler(s) continue to receive and process the raw transactions as depicted in FIG. 6A and described above. Referring back to FIG. 6B, the segment handlers 604 operate in parallel with respect to each other, with each segment handler making similar requests to its associated transaction handler. Thus, typically, there is a segment handler-transaction handler pair associated with a particular segment of the block being mined. The transaction handler 609 responds by providing the requesting segment handler 604 with each raw transaction from its mem pool, together with a digest that has been computed for the raw transaction. The segment handler 604 receives each transaction (and its digest) and sequences the transactions into a logical sequence for the segment. Each segment handler operates similarly for the raw transactions that it receives from its associated transaction handler, and thus the segments for the block are mined concurrently (by the segment handlers). As the segment handler sequences the raw transactions, it takes the digests of the transactions and outputs them (preferably just the digests) to all of the other nodes (via 607). The other nodes of the network use the digests propagated from the segment handler(s) to validate the segment that is being mined locally. A segment handler also receives digests from other segment handlers (in other nodes) via 608.

Once a segment handler 604 determines that a segment is valid, it returns the result of its processing, namely, the root of a Merkle tree computed for the segment, to the node coordinator via 606. During mining the node coordinator trusts that the segments are valid. The other segment handlers 604 (operating concurrently) function similarly and return their mining results indicating that their segments likewise complete.

Once all of the segment handlers respond to the node coordinator (with the Merkle roots of all segments), the node coordinator then computes an overall block Merkle tree (from all the segment Merkle roots) and generates a block header incorporating the overall block Merkle root and other information. The node coordinator then transmits/propagates a Mining Done message via 602 containing the block header to the other node coordinators in the network, and those other node coordinators then use the block Merkle root to complete their block verification process as will be described next.

In particular, assume now that the node coordinator 601 receives a Mining Start message via 603 transmitted from the node coordinator of another node initiating its own block mining operation. This begins a block verification process for block data mined and transmitted from the other node. The block verification process is a variation on the block mining process, but the two are distinct and frequently a node will be engaged in both processes simultaneously. Indeed, while a node typically mines only one block at a time, it can be verifying multiple incoming blocks simultaneously. As with mining, according to the techniques herein, and as has been described, in lieu of verifying a block as a composite, preferably a block is verified in "segments," i.e., individual segments of the block are verified separately (albeit concurrently or in parallel) and, in particular, by the segment handlers 604.

To this end, via 605 the node coordinator 601 instructs its associated segment handlers 604 to receive transaction hashes at 608 from other nodes and, in response, to verify the associated transaction block assignments made by the mining node's segment handlers as they mine/assign transactions to a block in the mining process. Preferably, verification of segment data is performed progressively (as the data is received) and concurrently with the mining/assignment of additional transactions to the block segments in the mining node.

Upon receipt of a transaction hash, via 608, a segment handler 604 forwards the transaction hash via 610 to the transaction handler 609 responsible for handling transactions for the segment. Upon receiving a transaction hash from a segment handler, the transaction handler 609 looks up the associated transaction record in its mem pool.

In the event the transaction is missing from the mem pool, transaction handler 609 sends a request (via 622) to receive the missing raw transaction (via 623), preferably from the transaction handler in the mining node responsible for having mined the transaction. This request/response action preferably is handled at high priority in an expedited manner Upon receiving the missing raw transaction, and prior to resuming verification of the transaction's block assignment, the transaction handler 609 must validate the transaction as described above before adding it to its mem pool.

Upon successfully retrieving the transaction from its mem pool, the transaction handler performs an assignment of the transaction to the block segment being verified just as it assigns transactions to blocks being locally mined as described above; if, however, the assignment fails, verification of the segment and the block of which it is a part fails (i.e., the block is rejected).

Subsequently, the node coordinator, applying a prescribed consensus algorithm, decides to finalize a block. To this end, the node coordinator persists the block header, and it instructs the node's segment handlers to finalize the block. In so doing, the node coordinator provides the overall block Merkle tree to each segment handler. Each segment handler, in turn, persists its set of segments associated with the block, and it instructs its associated transaction handlers to finalize the block. In so doing, the segment handlers generate and provide to the transaction handlers the portion of the block's overall Merkle tree each transaction handler needs for its set of segments. Each transaction handler, in turn, removes the finalized transactions from its active mem pool, and it responds to any outstanding transaction requests it received from the edge (or wallet) for finalized transactions and, in particular, with a Merkle proof derived from the portion of the block's overall Merkle tree the transaction handler received from the segment handlers. The transaction handler then saves the finalized transaction in memory, where it may be used to support subsequent queries that the transaction handler may receive concerning the disposition of a transaction. The transaction handlers then instruct all UTXO handlers to finalize the block. In response, the UTXO handlers mark UTXOs spent in the finalized block as permanently spent, and mark UTXOs assigned to the finalized block as permanently created. Persisting the block header and segments to disk in this manner thus adds the block to the blockchain. Depending on implementation, the block so written to the blockchain may then be considered final (and thus in effect immutable).

Summarizing, in the node processing described above, transaction handlers receive raw transactions, typically from the edge machines. After a transaction handler validates the raw transaction (and places it in its local mem pool), the transaction handler propagates the raw transaction to the appropriate transaction handlers in other nodes that are also responsible for validating that raw transaction. Subsequently, and in response to a determination by the node coordinator to begin mining a block segment, the transaction handler mines (assigns) a set of raw transactions from its mem pool to the block segment, and sends those raw transactions (and their associated digests) to the requesting segment handler that is handling the respective segment. The segment handler sequences the received transactions into the segment and, as it does so, the segment handler forwards the list of digests for the transactions comprising the segment to the other segment handlers responsible for handling those segments in the other miner nodes. Thus, raw transactions propagate across the transaction handlers in all nodes, but segment handlers preferably only send the transaction digests for the segments to be verified. During block segment mining and verification, transaction handers consult their local segment handler(s), which as noted communicate with the segment handlers of other nodes. Transaction handlers in different nodes thus communicate with one another to populate their respective mem pools with transactions that have been validated (using the UTXO and signature-verifiers). The segment handlers (and thus the node coordinator handling the mining) communicate with one another to populate the blockchain with a block comprising the segments. As previously noted, the transaction handlers and segment handlers need not be separate services.

As described above, block verification is similar to block mining, except that for verification the segment handler is feeding transaction hashes to its transactions handlers, which transaction handlers then respond with "valid" (with respect to the raw transaction) or "invalid" (with respect to the entire received block), and the latter response should not happen unless the miner is behaving erroneously or in an adversarial manner. The above-described technique of generating and handling of Merkle trees and roots is the preferred cryptographic mechanism that ties transactions to their block. In verification, and upon completion when the node coordinator gets results from all the segment handlers, the coordinator once again computes the overall block Merkle root, but this time it compares that root with the root provided in the block header sent to it by the mining block coordinator. If they do not match, the block is discarded as invalid.

The terminology used herein is not intended to be limiting. As used herein, the term "validate" is used for the operation that the transaction handler does when it receives a raw transaction to be put in its mem pool. As noted above, to validate a transaction, the transaction handler queries the UTXO handler(s) to check the availability of the referenced UTXOs and talks to the signature-verifier to check signatures (on the inputs). In contrast, the term "verify" is used for the act of verifying the contents of block segments received from other nodes that are likewise performing the consensus initiated by the node coordinator. A transaction validation may also be deemed an "initial transaction verification" as contrasted with the "block segment verification" (what the coordinator and segment handlers do with block segment data received from other nodes) in response to the coordinator initiating a mining operation on the block (comprising the block segments). Also, the term "mine" is sometimes referred to as "assign," meaning what a transaction handler does when it is told by the segment handler to assign or associate a transaction with a block segment, i.e., the transaction handler's verification of the transaction with respect to its inclusion in a block segment by the segment handler. As noted above, to accomplish this, the transaction handler communicates with its UTXO handler to "spend" existing UXTOs, and to "assign" new UTXOs to a block segment.

Also, the notion of a "handler" is not intended to be limited. A handler is sometimes referred to herein as a "coordinator," and the basic operations or functions of a handler may be implemented as a process, a program, an instance, an execution thread, a set of program instructions, or otherwise.

While the above describes a preferred operation, there is no requirement that a handler handle its tasks on a singular basis. Thus, a segment handler can handle some or all of the segments comprising a block. A transaction handler can handle the transactions belonging to a particular, or to more than one (or even all) segments. A UTXO handler may handle some or all partitions in the UTXO space. The term "partition" here is used for convenience to distinguish from a segment, but neither term should be deemed limiting.

The following provides additional details regarding the above-described node components in a preferred implementation.

Node Coordination

Node coordinator 601 participates in a network consensus algorithm to decide whether the node should mine a block or not, and from what other nodes it should expect to receive mined block data. If the node is to mine a block, node coordinator 601 sends messages (via 602) to the other node coordinators in the network. Node coordinator 601 also receives messages (via 603) from other node coordinators in nodes that are mining a block. As has been described, node coordinator 601 informs the node's segment handler 604 in messages (via 605) to start mining block segments and from what other nodes to receive and validate mined block segments. The node's segment handler 604 will return to the node coordinator 601 in a message (via 606) the Merkle root of the transactions comprising each block segment.

Another aspect of node coordination is managing node local representations corresponding to the one or more chain branches that may be active in the network at any given time. Typically, a blockchain consists of a single sequence of blocks up to the point of finalization. Finalization often is set to be some number of blocks deep in the chain, but the decision of what and when to finalize is subject to the rules governing consensus across the network. The part of the blockchain that is pre-finalized consists of potentially multiple branch chains that get resolved before finalization. As indicated above, for example, when multiple nodes mine simultaneously, they fork the blockchain into multiple branches that have some common ancestor block. The node coordinator 601 is responsible for tracking active branches and informing the segment handlers 604 which branch they are mining, if the node is mining, and which branch each remote miner is mining Segment Handling As also described, segment handlers 604 handle the generation and/or validation of some number of block segments representing a portion of block segmentation space. Specifically, the segment handlers begin generating block segments as directed by the node coordinator 601 in messages (via 605). When mining, a segment handler 604 transmits mined block segment data via 607 to segment handlers in the other nodes to be verified. A segment handler 604 receives block segment data in messages (via 608) from segment handlers in mining nodes. To perform transaction mining and validation, a segment handler 604 interacts with an associated set of transaction handlers 609 as also previously described.

Transaction Handling

Transaction handlers 609 handle the validation of transactions to be added to the mem pool and propagated to the network, the generation of transactions to be included in a mined block, and the verification of transactions to be included as part of a block received from a mining node. As noted above, the distribution of the transaction segmentation space may be the same for a transaction handler 609 and a segment handler 604, or it may be different. For example, the computational resources needed by the segment handler function may be sufficiently low that only a few such handlers are used to handle all the block segments, whereas the computational resources required by the transaction handler function might be sufficiently high so as to require that each such handler manage the transactions for a smaller number of segments than their associated segment handler 604.

The transaction handler function plays another important role in the system as also previously described, namely, transaction admissions (also referred to as "validation") and propagation. A transaction handler 609 receives transactions in messages (via 612) from the edge either directly or indirectly via other transaction handlers in the network. The transaction handler 609 validates all received transactions and if valid, saves the transactions to a pool of unprocessed transactions (its mem pool) and optionally propagates the transactions to other nodes in the network in messages (via 613). In this way, the transaction handler function orchestrates the propagation of transaction data such that all nodes receive all incoming transactions and associated incoming transaction digests in a timely and efficient manner.

UTXO Handling

Preferably, UTXOs are identified by an identifier (txid), which is a hash or digest of the originating transaction, and the index of the output in the originating transaction. A UTXO also has two other pieces of information (not used in its identification), namely, a value, and a "locking script." Generally, the locking script is a set of instructions or simply a public key associated with the output. Sometimes the public key is called an address or wallet address. The locking script (e.g., the public key) is conveyed in the output of a transaction along with the value, and typically it is stored in a UTXO database along with the UTXO identifying information and its value. Thus, a query to the UTXO handler during initial transaction validation returns both the value and the locking script (public key). To spend a UTXO as an input to a new transaction, the new transaction (essentially its outputs), must be signed by the private key cryptographically matching the public key of the UTXO to be spent. This signature is provided with each transaction input and is generally called the "unlocking script." The unlocking script can be a set of instructions or simply a digital signature. Thus, the digital signatures bind the output values of the transaction to the locking scripts (public keys) for which the receivers of the values presumably have the corresponding private key (later used to formulate an unlocking script). The signature verifier does not have the private key (as only the wallet or cryptographic element thereof has the private key). The signature verifier receives the public key (from the locking script) and a signature (from the unlocking script), and the signature verifier verifies the signature against the public key, thereby proving the signature was produced by the matching private key. To summarize, a transaction output at a given index has a locking script (public key) and value. A transaction input has the originating txid, index, and an unlocking script (signature).

To handle transactions, and as noted above, the transaction handler interacts with a set of UTXO handlers 614 with messages (via 615 and 620) to create, query, spend, and assign Unspent Transaction Outputs (UTXOs) associated with each transaction. Each UTXO operation may also be reversed using an undo request in messages (via 620). This reversibility is valuable because it allows for a transaction handler 609 to undo the parts of transactions that may have completed successfully when the transaction as a whole fails to complete. Instead of locking UTXO databases to allow concurrency and prevent conflicts, here the system preferably relies on detecting conflicts and reversing UTXO operations for partially complete transactions. Conflicts in this context include, but are not limited to, an attempt to spend a UTXO before it exists or is finalized (as policy may dictate), spending a UTXO that has already been spent by another transaction, or any other UTXO operation failure that renders the transaction incomplete.

As noted above, each UTXO has a value and an locking script that must be executed successfully for the transaction to validate. The script is a set of instructions that must be executed to lock the use of a UTXO as an input to another transaction. Commonly, the script contains public key material that corresponds to the private key that must be used to sign transactions that consume the UTXO as an input.

Because the number of UTXOs that accumulate can grow large, the UTXO space preferably is also partitioned by transaction identifier in a manner similar to how blocks are segmented by transaction identifier, although preferably the partitioning and segmentation spaces are divided according the needs of each independently. While UTXO handling could be performed by the transaction handlers that produce the UTXOs, preferably the handling of UTXOs is separated out from transaction handling for two reasons: (1) because the resource demands are different, and (2) because isolating the transaction handler function enables the transaction and UTXO handlers to perform more efficiently. Preferably, the UTXO space also is partitioned to make more efficient use of a node's aggregate memory and storage resources. By applying this segmentation (namely, through the transaction segmentation space), a highly scalable and timing-constrained solution is provided.

Signature Verification

The final element in the block diagram in FIG. 6A is the signature verifier function provided by a set of signature verifiers 617. As noted above, preferably transactions are signed by the set of private keys associated with the transaction's inputs. The most compute intensive task in a node is verifying the signatures of a transaction. Consequently, significant computational resources preferably are dedicated to signature verification. Each signature verifier 617 preferably harnesses the computational resources necessary to support a portion of the signature verification load, and the transaction handler function disperses the signature verification load across the available set of signature verifiers 617 using messages (via 618) to send the data to be validated, and in return receiving acknowledgement or negative acknowledgement in messages (via 619). In one embodiment, these operations are carried out by combining signature verification with some other processing (e.g., transaction handling). In another embodiment, and as depicted and described, to allow for greater scalability, the processing demand is accommodated by enabling signature verifiers 617 separate from other elements.

Pipelined Block Generation, Transmission, and Verification

Figure 7:
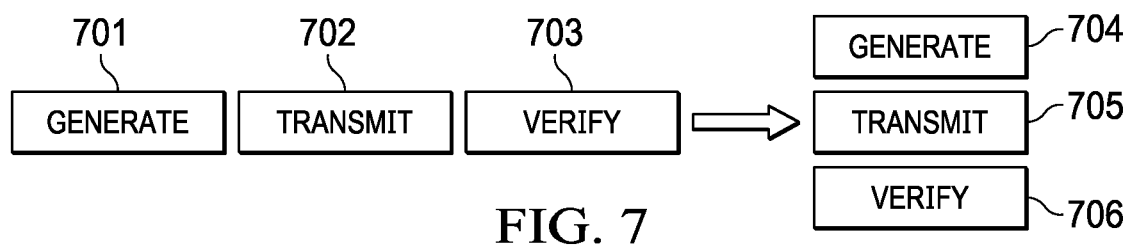
FIG. 7 is a high level depiction of a concurrent processing technique of this disclosure.

Referring to FIG. 7, traditional blockchain based systems serialize the generation (mining), transmission, and verification of blocks. In such systems, a block is generated 701 by a miner; once the block is finished being generated, it is transmitted 702 to other nodes for verification, and once nodes finish receiving a block, they begin to verify 703 the block. Such serial-based processing is inefficient and does not scale, especially in the operating context previously described, namely, wherein transaction messages are being generated across a potentially global-based network.

When attempting to build a system with high performance requirements, e.g., such as being capable of processing millions of real-time transactions per second, such current implementation approaches are entirely inadequate. For this reason, in the approach herein (and as described above), preferably these processing stages are pipelined for concurrency. Thus, according to the techniques herein, while a miner generates 704 block data, previously-generated block data is transmitted 705 to nodes for verification. The verifying nodes receive the mined block data and begin verifying 706 the block's transactions before receiving the complete block and likely long before the miner has finished mining the block.

It should be appreciated that in accordance with FIG. 5, the pipeline of block generation, transmission and verification also is instantiated for each segment of a block and that, as such, block segments are operated on in parallel. The result is greater concurrency through the combination of parallel and pipeline processing.

Streaming Block Generation, Transmission, and Validation

Figure 8:
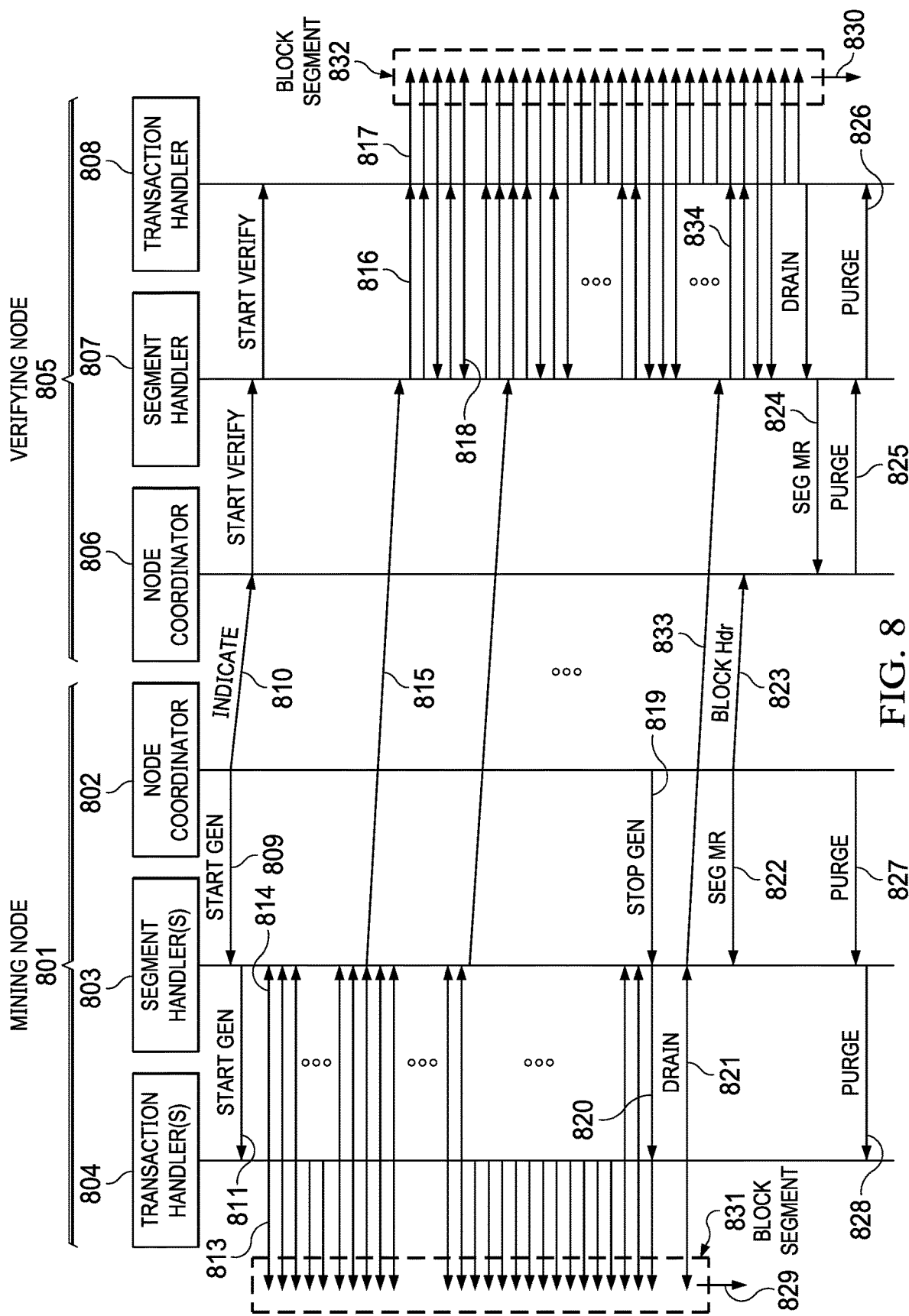
FIG. 8 is a detailed depiction of the operations that are carried out among various nodes and node elements to provide streaming block generation, transmission and validation according to this disclosure.

Referring to FIG. 8, to support pipelined block generation, transmission and verification a streamed block segment generation, transmission and verification process is shown between two nodes, namely: miner node 801 and verifying node 805. Although one verifying node 805 is shown, as described above typically all nodes in the network verify the mined block. As has also been described, this process also typically runs concurrently with the same process for other block segments being mined by miner node 801. As noted, there may be multiple miner nodes 801 and multiple streamed generation, transmission and validation processes operating in the network concurrently. Note that in this example, the responsibility of staging a segment for persistence is associated with the transaction handlers as opposed to the segment handlers, as described previously.

Generation

As shown in FIG. 8, the process starts when mining node coordinator 802 meets the criteria for mining a block on the network. In one embodiment, this criterion could be a probability condition that the miner can prove it meets (e.g., a trusted or otherwise verifiable random number below some threshold). Any criteria for miner selection (leader election) may be applied. Node coordinator 802 sends messages 809 to request that mining node segment handler 803 start generating block segments. Node coordinator 802 also sends messages 810 indicating to the validating node's coordinator 806 to expect mined block segments from the miner node's segment handler 803. Each mining segment handler 803 sends message 811 to their associated transaction handler(s) 804 indicating that transaction handler(s) 804 start assigning transactions from a pool of collected raw transactions associated with each transaction handler 804 to a block. Transaction handler 804 repeatedly inspects unprocessed transactions (transactions that have not previously been assigned to the block or any ancestor thereof.) that it received from the edge (directly or via transaction handlers in other nodes). It should be appreciated that some aspects of transaction verification (transaction validation as described above) may be done in advance when the transaction is first received. For each verified transaction assignment, transaction handler 804 (1) adds the full transaction record 813 to block segment 831, and (2) sends message 814 containing a digest (e.g., a hash) in a stream to segment handler(s) 803.

Transmission

Segment handler 803 collects one or more transaction digests from the stream of messages 814 and sends the transaction digests in a stream of messages 815 to the segment handler 807 in each validating node 805 responsible for validating the generated segment data. As shown, the number of messages in the stream of messages 814 may differ from the number of messages in the stream of messages 815, though the total number of transaction digests transmitted in both streams typically will be the same.

In validating node 805, segment handler 807 receives a stream of messages 815, extracts the transaction digests, and sends one or more messages 816 to transaction handler 808. The number of messages comprising the streams of messages 815 and 816 may differ. In this embodiment, transmitted message 810, stream of messages 815 ending with message 833, and message 823, may be transmitted unicast or multicast, directly from node element to node element, indirectly propagated through elements in other nodes, or routed or forwarded through network elements. The data may travel aggregated or separated.

Verification

Verifying transaction handler 808 receives the transaction digests and lookups unprocessed transactions it has received from the edge (directly of via transaction coordinator in other nodes). If the lookup is successful, it verifies the transaction assignment. Upon successful verification, transaction handler 808 (1) sends verification acknowledgements in messages 818 to segment handler 807, and (2) adds the full transaction record 817 to block segment 832.

End of Stream Handling

In one embodiment, the streaming generation, transmission, and verification process ends when mining node coordinator 802 sends a stop generation message 819 to all mining segment handlers 803. In this scenario, nodes are assumed to be running asynchronously, and with no explicit time boundary between execution rounds. In another embodiment, nodes may run in a synchronous manner, and the process would end when a specific time is reached.

When the process ends, each segment handler 803 sends a stop generation message 820 to its associated transaction handler 804. Each transaction handler 804 finishes or aborts any transaction assignments that are still in progress and acknowledges that it has stopped mining along with any remaining assigned transactions included in the block segment in message 821 to segment handler 803.

Segment handler 803 sends any unsent transaction hashes and an end-of-stream indication in message 833 to validating node's segment handler 807. Each segment handler 803 computes a Merkle tree from the transaction hashes of each segment and sends the Merkle tree root (Merkle root or MR) to the node coordinator 802 in message 822. When the node coordinator 802 receives a Merkle root for all segments of the block, it computes the top of the Merkle tree for the overall block from the segment Merkle roots and generates a block header composed a hash of the previous block header, its mining proof, and the overall block Merkle root, and other data. On failure, node coordinator 802 send purge message 827 to each segment handler 803 which in turn sends a purge message 828 to its associated transaction handler(s) 804 that then discards the block segment. On success, node coordinator 802 sends the block header in messages 823 to all validating node coordinators 806.

When each verifying node's segment handlers 807 receives end-of-stream indications in messages 833, they in turn send to their associated transaction handlers 808 messages 834 indicating the end-of-stream verification. When each segment handler 807 has received acknowledgements for all outstanding transaction assignment verifications from its associated transaction coordinator 808, it computes the Merkle trees for its segments and sends the Merkle root for each segment in messages 824 to verifying node coordinator 806. When verifying node coordinator receives Merkle roots for each segment, it generates a block header, and verifies that the block header it generates matches the block header it received in message 823. If the block header does not match, it sends purge message 825 to each validating segment handler 807 which, in turn, sends purge message 826 to its associated transaction handler(s) 808 that then discards the block segment.

Finalizing a Block

As noted above, in the above-described system a block is not persisted until it is finalized. Preferably, the block is not finalized until the node coordinator concludes that is should be finalized based on having adhered to a prescribed consensus algorithm. In contrast, preferably at the conclusion of mining, a block is not persisted. Rather, after mining, a block is simply tracked until it is either finalized (per the consensus algorithm) or thrown away (purged), in the latter case because it did not survive the application of the consensus algorithm.

Thus, and as described, the approach herein leverages a high-quality, low-latency, highly-interconnected core network (the mesh) in conjunction with block segmentation and other above-described features (e.g., topology-aware data propagation, non-blocking architecture, optimistic concurrency control, partitioning, multicast and the other features) to provide a computationally-efficient transaction processing system, all without any central transaction routing or switching (e.g., a Layer 7 switch that needs to account for an route large numbers of transactions). Preferably, the architecture is used in conjunction with a global CDN network to provide global reach, and this approach advantageously enables CDN mapping technologies to be conveniently leveraged (e.g., by clients and other transaction services) to discover and interact with the computing elements in the core network.

By way of additional background, leader election and miner selection are activities performed at prescribed times. In a blockchain system, example scenarios include, but are not limited to, periodic intervals, system initialization, system or component error and failure recovery, and start/stop block generation events.

The distributed system of record described herein provides for a permissioned, highly-secure computing environment comprising a set of computing nodes. For mining, a mining proof is data presented by a computing node that mathematically proves the node is a legitimate miner of a block or portion thereof. The data preferably is recorded in a block header such that proper blockchain construction (namely, trust), is self-verifiable. According to this disclosure, mining proof is provided, preferably using some available source of trusted random numbers. In this approach, preferably a node uses a memory-encrypted trusted computing element to generate real random numbers to facilitate producing mining proofs that exhibit the properties desired.

The following is an additional glossary of terms used herein.

A blockchain is an append-only immutable chain of data blocks, wherein the presence of a transaction recorded within a block, and a block within the chain, are verifiable via cryptographic hashes. A block is a collection of transactions. It contains a cryptographic hash linking it to a previous block, forming a chain. Multiple blocks can be linked to a previous block, but only one finalized block can be linked to a previous block.

A merchant is an entity that executes a trade of goods or services for payment. A merchant has a bank account that is managed by an acquiring bank, and typically it maintains point-of-sale terminals (or other legacy infrastructure) responsible for generating valid payment requests. More generally, a point-of-sale terminal is a type of merchant connector (MER) that generates payment requests.

A wallet is a collection of private-public key pairs and reference to unspent transaction outputs, which are "stored value," and that are used to create transactions. A "wallet service" typically is a software entity that securely maintains a collection of wallets, proxies requests between external entities and a core network of computing nodes that support the blockchain, and that process the corresponding reesponses.

A wallet service may utilize a multiple wallet processor (WP) or equivalent processing function.

As described above, an Unspent Transaction Output (UTXO) is an output from a finalized transaction that contains some value and that is associated with an address. UXTOs can be passed as an input (spent) to a transaction that is created by a wallet holding the associated private key. A UXTO can only be spent once.

An acquirer is an institution where a bank account is held. An acquirer typically operates legacy infrastructure that is responsible for authorizing payment requests. This infrastructure is sometimes referred to connection module for an acquirer or an operator.

A administrative server is a service external to the payment network that provides one or more services, such as clearing, operator and merchant bank processes, regulatory compliance, and the like.

A ledger service (sometimes referred to as "ledger services") is a distributed system that processes transactions and maintain a core ledger. The core ledger is the system of record maintained by the ledger service utilizing the blockchain technology described herein. The core ledger is a distributed system that processes transactions and creates the blockchain.

A payment network is a network that combines wallet services and the blockchain core ledger (ledger service). Wallet services receives client transactions, routes the transactions to a wallet processor (e.g., a WP), applies the necessary payment logic, and then forwards valid transactions to the ledger services. Ledger services, in turn, receives transactions from the wallet services, validates, processes, and records them onto the blockchain-based ledger. Processed transactions, consisting of the original legacy transaction and its corresponding blockchain transaction from ledger services, may be stored in a storage services for long-term persistence. The storage system may be used to respond to historical queries, and to provide backup for disaster recovery. A payment network may also include a data cooperation service to provide an interface to handle administrative traffic. Customer transactions enter the system via wallet services, while administrative requests (wallet updates, data center updates, historical queries, etc.) enter the system via the data cooperation service, which validates requests before forwarding them to the correct service. Preferably, the data cooperation service exposes a set of RESTful application programming interface (API) endpoints and, as a result, supports any client that can make a TLS mutually-authenticated REST-based HTTP request and send data represented by JSON.

Extended Transaction Capability

The above-described design focuses on the major functional units of the system and on how to organize and handle the data to meet high performance requirements. As described, one preferred design involves segmenting blocks of transactions and partitioning the Unspent Transaction Output (UTXO) data structures. As a variant, and according to the subject disclosure here, the UTXO concept is generalized into a more general concept of Transaction Output (TXO) exhibiting a variety of behaviors supporting different use cases.

For example, a TXO may be used to produce data or attributes that are intended to be referenced by, but not consumed by, future transactions. Or, for example, a TXO may represent value that can be partially-consumed instead of wholly consumed by transactions. Or, as another example, an TXO may be used to transitively impart an inherent idempotency of a blockchain transaction to some external messaging regime. Generalizing, the resulting data organizations supports a wide variety of new capabilities while retaining the concurrent processing of the above-described basic design, thereby resulting in additional capabilities but still with equally high transaction throughput and low transaction processing times.

Formally, this disclosure introduces a set of extensions to transactions and their associated TXOs and addresses. These extensions, as will be described below, support a variety of new transaction capabilities, e.g., that enable the enforcement of business logic associated with loyalty point programs and other generalized applications of a distributed system of record, while at the same time exhibiting the high performance characteristics previously described. These extensions are not limited in their application.

Indeed, there are a wide variety of applications that are enabled by or would benefit from a high performance distributed system of record. The challenge is that many such applications require the application of business logic in addition to or instead of simple value management. Accordingly, a focus of this disclosure is on incorporating more complex transaction processing capabilities, thereby extending the benefits of the system to those applications while retaining the performance and scale the original design achieved. Requirements for loyalty point programs, for example, include a variety of rules such as when points become valid, when they expire, how they may be refreshed or suspended, as well as other contract provisions. To ensure correct and trustworthy application of such logic, it is important that the logic and its applicable inputs and outputs be expressed on the ledger. To that end, in one embodiment, the disclosure herein takes the traditional concept of an Unspent Transaction Output (UTXO) and generalizes it to be Transaction Outputs (TXOs) that may be used to support rich expression of business logic while allowing controlled global changes to a set of TXOs, as well as the specification of timing and conversion information.

According to one embodiment, the following techniques are or may be implemented. First, the approach herein provides for the addition of attributes attached to TXOs that can be checked when TXOs are used as input to transactions. In general, the value of a TXO includes its attribute information. Second, the approach herein provides for the addition of attributes attached to blockchain addresses that can be checked when TXOs are processed. In this approach, transaction handler transaction processing recipes preferably are formulated to check the relationships among the attributes in the input and output TXOs and their respective addresses. Further, transactions that use TXOs may do so in a manner such that the value and attributes of the TXOs are used, but not consumed, in the processing of the transactions. That is, the TXO is referenced, but not spent. Further, and depending on implementation, transactions that use TXOs may do so in such a manner that the transaction may only succeed if the referenced TXO represents a sequence of state transitions of associated client entities. In another aspect, preferably transactions that use TXOs do so in a manner such that the value of the TXO can be mutated (e.g., only partially consumed) by transactions. Further, the approach herein provides for the ability to set, reset, change, or conditionally mutate the value of TXOs in the transition from one block to the next. This is also referred to as edge-triggered action. According to still other features, transaction processing may be deferred if a conflict is detected in the mutation of a TXO. Transactions that use TXOs preferably do so such that the transaction can only succeed if the TXO or an attribute of the TXO does not already exist. This capability may be used to create idempotency, collision resilience, and history for external messaging regimes. According to a further aspect, transactions that use TXOs may have a limited lifespan (e.g., valid-after, valid-before) expressed in terms of blockchain time. The disclosure herein also provides for extensions to transaction formats and semantics that incorporate the handling of different types of TXOs and the implementation of extended business logic (e.g., rules, limits, contract provisions, conversions, etc.) enabled by the new types of data associated with TXOs.

The following provides additional details regarding these properties and how they work together to allow complex interactions to be recorded on the blockchain while maintaining very high performance and scalability.

By way of background, transaction logic may be expressed on the chain in a variety of ways including, but not limited to, transaction types that cause specified transaction processing (however this processing is embodied), transaction rules expression (as described herein), and programmatic expression generally associated with smart contract execution. The value associated with a transaction input or output may be any data, structured or unstructured, in addition to or instead of a simple numeric. Transaction inputs include material used to unlock value including, but not limited to, a signature information with or without an associated public key, a set of attributes that may or may not include signature information, a set of instructions that may or may not include attribute information. Transaction outputs include material used to lock value including, but not limited to, a public key, a hash of a public key, an address identifier, attribute information that may or may not include public key or address information, and a set of instructions to execute in creating locked value that may or may not include attribute information.

Figure 11:
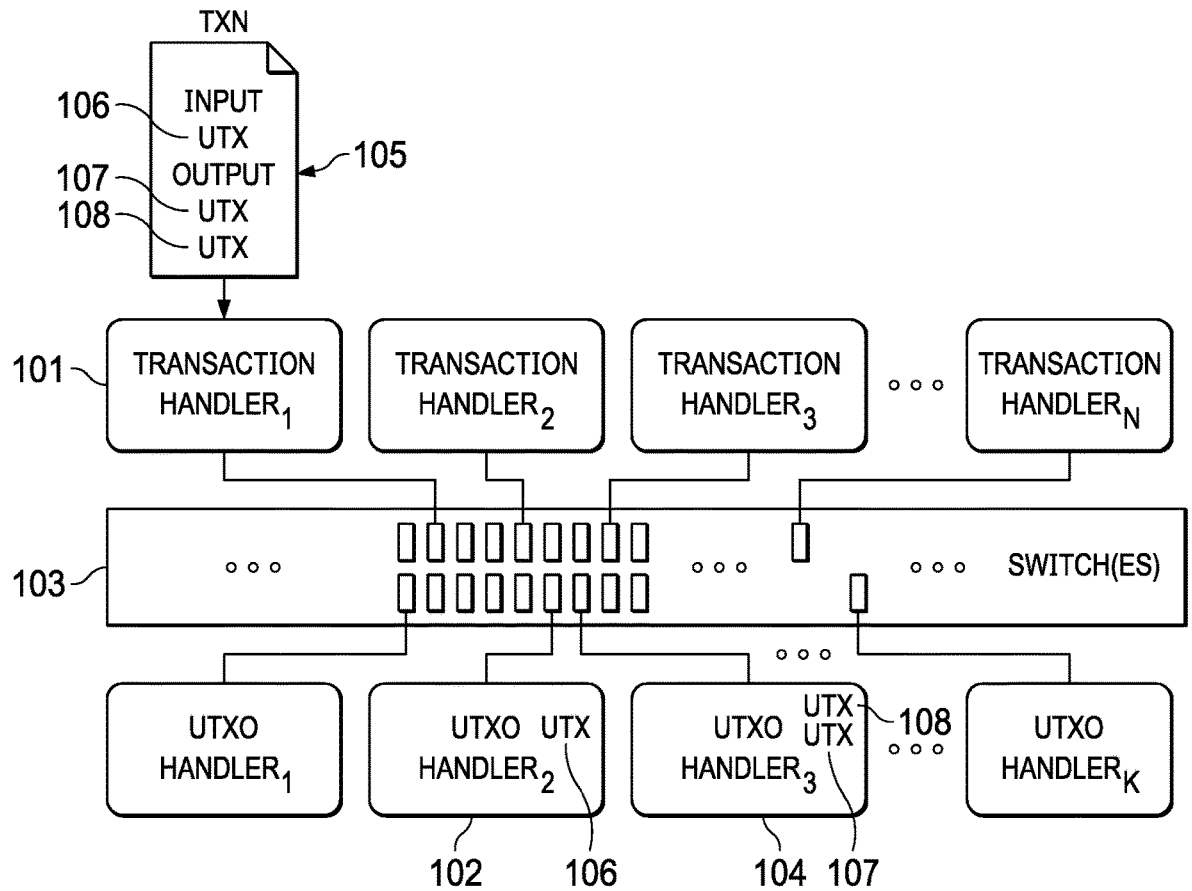
FIG. 11 depicts a set of transaction handlers in which one or more of the extended processing techniques of this disclosure may be implemented.

Referring to FIG. 11, shown is the general case of some number (N) Transaction Handlers communicating with some number (K) UTXO Handlers via communications networks composed of network elements such as switches 103. As previously described, Transaction Handlers 101 process transactions for a set of segments in a segmented transaction space. UTXO Handlers 102 process Unspent Transaction Outputs (UTXOs) associated with transactions in a partitioned UTXO space. Segmentation and partitioning in this context typically refer to the similar notion of dividing a space such that portions of the space may be handled separately. Different terms are used to emphasize that these spaces can be setup in a completely independent manner.

Again referring to FIG. 11, for example, Transaction Handler 101 is validating transaction 105, which in this example consists of input $UTXO_0$ 106 and outputs $UTXO_1$ 107 and $UTXO_2$ 108. In this example, assume $UTXO_0$ 106 is handled by UTXO Handler 102 while $UTXO_1$ 107 and $UTXO_2$ 108 are handled by a different UTXO Handler 104.

The following section describes the notion of TXO types and attributes according to this disclosure. An aspect of this disclosure is providing for the ability to include attribute information with transaction outputs (TXOs). As described below, this attribute information may be encoded and used in a variety of ways. For compatibility reasons, and in one implementation, the attribute information may be thought of as an extension to a monetary value of a TXO, though there is no requirement for a TXO to have any monetary value or any attributes for that matter. TXO attributes may be used simply to store data by blockchain consensus. Wallet information, for example, can be stored this way instead of relying on lower performing, less reliable databases. Another use case for TXO attributes is to enhance and constrain transaction execution. Transaction execution may require certain attributes exist or require that they do not exist or that a particular attribute or set of attributes be consistent across all transaction inputs. For example, if business rules dictate that value in the system be differentiated by type, TXO attributes can be used to identify the value's type and ensure that different types of value are not mixed inappropriately.

In one embodiment, the TXO attribute approach herein includes the following aspects.

1. TXOs are defined to have optional additional information stored along with the public key and value. Conceptually, these are a set of key-value pairs. Preferably, TXOs with attributes are created, stored and removed (spent) in the same manner as ordinary UTXOs.
2. This additional information preferably is attached to the TXO in the output of a transaction, stored in the TXO database, and returned to the Transaction Handler when it looks up a TXO in the database.
3. Preferably, TXOs may be linked to other TXOs by like-named attributes. This allows attributes to be shared among several TXOs.
4. Preferably, the transaction handler is extended to handle different kinds of transactions. In particular these transactions may be written so that they can do the following processing in addition to checking the signature associated with each TXO:
    a. Check multiple TXOs to see that each have an attribute with the same key, and a matching value. For example and key type might be "points-program" with a value that matched to the users points-program characteristic and contained a given expiration date.
    b. Check to ensure that a particular attribute does or does not exist
    c. Copy the value of an attribute from an input to an output
    d. Check a time attribute against the current block-time
This list is not intended to be exhaustive. The transaction would contain this logic and the type would be specified.

Figure 12:
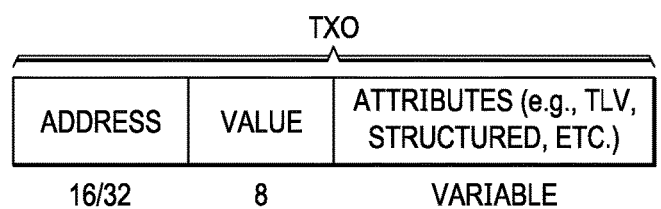
FIG. 12 depicts a representative TXO data structure.

Referring to FIG. 12, preferably a TXO is formed as follows. In particular, a conventional UTXO is extended to have more than an address and value. As shown in FIG. 12, the TXO has a variable length set of attributes. From the TXO handling perspective, preferably these attributes are opaque and are used during transaction processing. This is not required, however, because the attributes may be configured such that they may be used by both transaction processing and the TXO handling, e.g., to effect coordinated handling semantics. For example, this is one way that TXO expiry could be communicated: an expiry attribute is defined and used in the formulation of a transaction. The transaction specifies the time in the blockchain timeline that the TXO will expire. In so doing, all nodes can process blocks with the same concurrent processing rules described above and reach the same conclusion about the expiry of the TXO.

Reference TXOs

TXOs may be used as Reference TXOs, which is now described. In particular, some business logic systems such as loyalty points and prepaid cards often require some notion of contract or external state. The nature of the contract or external state may well be shared across a number of TXOs in the system. Examples would include expiration times, "not before" times, and currency (or point) exchange rates, as well as merchant, product, and service restrictions. More generally, the rules and data governing transaction handling in such systems can be extremely diverse and complex.

An example is a set of loyalty points, represented by several different TXOs sharing a common expiration date. If these points are part of a program where the expiration date is reset every time there is activity in the account for the point program, there must be a mechanism to efficiently update the expiration dates for each affected TXO. In this case, and according to a further aspect of this disclosure, a Reference TXO (RTXO) is employed such that a group of TXOs are associated with a common RTXO. When the RTXO is updated, all of the associated parameters with the RTXO are effectively updated or inherited by the referencing TXOs at the same time. Another example involves exchange rates. For some use cases, it may be necessary to exchange one kind of currency for another, for example, converting points to Yen, or computing the number of points associated with a particular kind of transaction. Setting the exchange rate using a signed reference containing the current exchange rate allows a trackable, unforgeable, repeatable computation of the appropriate outputs.

Generalizing, implementing the Reference TXO (RTXO) involves several changes to both the transaction processor and the TXO handler. These changes include, but are not limited to, the following:

1. Transaction inputs can be marked as "do not consume." When so marked, the TXO is referenced but not consumed by the transaction. Instead, the TXO remains in the database unchanged. Such TXOs can be used in multiple transactions during the same block creation interval because they are constant. This option increases parallelism among transactions and reduces churn in the TXO database.
2. Preferably, an RTXO must not be both consumed and referenced (that is, included in another transaction with the "do not consume" mark) during the same mining interval.

Some characteristics of Reference TXOs (RTXOs) that make them effective include the following. They can optionally be used as input to a transaction without being consumed, thereby providing reference data to the handling of a transaction. An RTXO can be updated by specifying its existing TxId:Index on the output side of a transaction. An RTXO can be changed while transactions that reference the RTXO remain valid. A change to an RTXO then takes effect for the next (descendent) block. If an RTXO is modified more than once in any block, the outcome is invariant with respect to the order of execution of the transactions in a block.

Preferably, transactions that use RTXOs are those that have been given specified transaction identifiers. These transactions will check to make sure that the TXO constraints have been met in order to execute a transaction.

The following describes a representative transaction structure with RTXOs. Referring to FIG. 13, on the input, the only change is to add the Do Not Consume (DNC) flag, which will prevent consumption of the input and allow sharing of that input across multiple transactions within the same block. On the output side, the change is to add an attribute block along with the public key and value. Alternatively, the "do not consume" semantic might be added as an attribute of the TXO when it was first created. In this way, whether to consume or not consume the TXO is dictated by the attributes of a TXO as interpreted by different transaction formulations.

The following are several example scenarios involving the RTXO construct for a loyalty points program.

One example, is a point expiration update transaction. This transaction consumes a RTXO with a specific identifier, and creates a new one with that identifier. The new RTXO has the new expiration date.

Another example is a point spending transaction. This transaction has two inputs, namely, the RTXO with the point information, which includes the point operator and the expiration date. It (usually) has two outputs, namely, the points being sent to a merchant for redemption, and the change being sent back to the customer. The points being sent to the merchant are tagged as belonging to the particular point program using a reference that was stored in the RTXO describing the point value.

Another transaction is a point RTXO that comprises a Label (this is how the points reference this UTXO), a PointType, an Expiration, and a Merchant-Label. When the input is processed, both the RTXO and the UTXO to be spent are looked up in the UTXO handler. The data associated with both is returned. The transaction handler must check to ensure that the labels match, and that the output UTXOs are also labeled correctly. The signatures must also be verified. If these conditions are met, then the transaction can be added to the Ledger in the normal fashion.

Another use case is a card authorization transaction. This use case puts a hold on a certain amount of value that has been approved. This value can only be spent with a specific merchant for a specific period of time. To create the reservation, preferably the system is configured as follows:

1. Spend UTXOs in the amount of the reservation in a transaction that creates another UTXO that is reserved for the merchant receiving the hold. This UTXO is sent back to the source wallet, with an expiration time on the hold associated with the UTXO. A second UTXO is sent to the merchant wallet. This second UTXO can be used to cancel the reservation.
2. If the purchase goes through, the UTXO is spent to satisfy the contract.
3. If the purchase does not go through, then the restriction on the UTXO will expire, and the UTXO can be spent for any merchant.
4. If the reservation is cancelled, the merchant can free the reservation with a UTXO that references the encumbered UTXO and is signed by the merchant. These two UTXOs are then processed in a transaction that replaces the encumbered UTXO with an unencumbered UTXO.

Another use case involves client entity state transition sequencing. This use case associates a RTXO with client entity state versioning, and it may be used to facilitate derivation of entity tags in the context of a ReSTful client. This enables a client to assert what version of entity state it is basing its decision on in the execution of a transaction. A failure of such a transaction then signals the client to update its state.

The above-described use cases are merely exemplary.

Idempotency TXOs

Blockchain transactions execute only once and are naturally collision-resilient. To faciliate using the above-described blockchain technology in connection with message regimes that are not native to the blockchain (e.g., legacy ISO8583 based financial systems), support for either idempotent or collision resilient handling of external messages is generally required. The database technology required often makes it difficult and expensive to support these properties in a highly-scalable distributed manner, and maintaining consistency between the database and the blockchain is generally not possible in all cases. To address this problem, and according to a further aspect, an Idempotency TXO (ITXO) is provided. The ITXO as described herein enables a blockchain-based ledger to be used as a high performance database for handling the external messaging. In one embodiment, a blockchain TXO output is defined with a key and value and optionally an expiry whereby the key is derived from, and uniquely identifies, the external message. In this case, the ITXO identity is then the same for all blockchain transactions that attempt to create it. If multiple blockchain transactions attempt to create the TXO, at most one will succeed while others fail because they attempt to create a TXO that already exists. Preferably, expiry is expressed in blockchain time and all correctly behaving blockchain nodes apply the expiry in exactly the same manner with respect to the block generation time when assigning transactions to the block in the blockchain. This ensures that the external construction of the blockchain transaction cannot result in honest nodes making different decisions about the validity of the transaction.

Generalizing, ITXOs enable services external to the blockchain to send multiple transactions that represent a single intent with the guarantee that only one transaction representing that intent will succeed. The alternative handling of the external messages can either all respond with the one handling that succeeded, thereby achieving idempotency, or all but one can be allowed to fail, thereby achieving collision resilience. In this way, and among other advantages, multiple unsynchronized or only loosely synchronized actors can safely and efficiently act to achieve active-active or multi-active redundancy.

One way of formulating the ITXO is depicted in FIG. 14. In this example, the ITXO is identified not by its originating transaction, but by an externally-defined collision key. If the ITXO already exists on the blockchain, any attempt to create it again will fail. Again referring to FIG. 14, in this example, the ITXO record also contains an expiry, preferably expressed in blockchain time (BCTime). If the blockchain time for a generated block exceeds the expiry, the transaction creating the ITXO cannot be assigned to the block. Once a block with a blockchain time exceeding the expiry has finalized on the blockchain, the ITXO can safely be pruned from the TXO database. Finally, in this example, a transaction identifier (the TXID) is included in the ITXO record. This allows a query of the ITXO based on its collision key to reveal what blockchain transaction was successful in creating the ITXO. The size and formulation of the collision key can vary depending on the application context, the expiry and TXID fields are not required, and the ITXO record could, in principle, contain any type and amount of data.

History and General Data TXOs

Another problem related to adapting blockchain technology to external messaging regimes is how to create historical and ancillary records associated with the external messaging. This issue arises, for example, in the processing of messages from legacy financial systems. A secondary database could be used for this purpose, but this creates performance and consistency issues. Instead, and according to a further aspect of this disclosure, generalized TXOs are leveraged such that ancillary data (e.g., history records) for external messaging are generated at the same time the transactions are added to the blockchain; this approach thereby leverages the performance of the ledger while precluding the possibility of inconsistency between the a secondary database and the ledger.

A further generalization of the TXO concept is to define a key and an associated value: a basic key/value tuple. The formulation of the key and value can vary depending on its application. In the example of representing history, the data to represent history is extracted as specified from the external messaging and used to formulate both the key and its associated value. Handling key collisions may differ depending on the application. For example, it is possible in some applications for the same key to map to multiple external messages that are differentiated by the key's value. In this case, collisions are permitted and the multiple records are recorded.

Referring to FIG. 15, a simple structure may be used as a transaction output. In so doing, a record is created in the TXO database keyed by the given key as opposed to the transaction hash. The data may or may not include the originating transaction (as with the ITXO) and it may or may not include a reference to an address or to other TXOs. The data may be structured in any manner and represent any state the client wishes to maintain in a manner that is consistent with the blockchain.

More generally, the insight is that building and maintaining a key/value store using blockchain transactions results in a high performance, authenticated, resilient, and globally consistent representation of related data in the system. The stored data is authenticated because all changes to the blockchain required a signed transaction and the signature must verify before data is added to the blockchain. Likewise, use and/or consumption of the data is authenticated. This solves the problem of maintaining and reconciling secondary secure databases that are disparate from the blockchain thereby making the blockchain system adaptable to a wide range of applications beyond simple value management.

It should be appreciated that the mechanism defined here is not restricted to a single key and single value. In other words, it naturally extends to column stores, document stores, and more complex database constructs. Further, query access to the resulting data can be equally rich and diverse. Thus, blockchain transactions and consensus primitives can be leveraged to build correlated and consistent databases.

Summarizing, rather than requiring the use of a full contract language to express business logic, where such languages exhibit severe security and performance issues, the above-described TXO mechanism provides storage and authentication traceability for business logic that works with blockchain ledger technology that offers low response times and scales to support millions of transactions a second. This enables rich and flexible business logic to be implemented while maintaining performance by limiting the changes to executing special types of transactions and by maintaining extra data associated with TXOs.

The following section describes several additional aspects of this disclosure.

Mutable TXOs

By way of background, financial systems often require applying limits and counting, e.g., limiting the value or frequency that an individual can withdraw money from his or her bank account. These types of restrictions are often done to protect both the institution and the individual from theft and fraudulent activity; or, limits and counting along with associated reporting can simply be part of the business proposition that the institution is providing its customers. While traditional blockchain systems provide strong cryptographic guarantees that the possessor of value has unlocked and assigned some or all of that value to the desired receiver, they do not generally have constructs that support notions of limits and counts. Once again then, the prospect and associated issues of using a secondary database to support these constructs arises.

According to a further feature of the generalized TXO design, TXOs that may be either partially consumed (decreased) or partially produced (increased) by a transaction are defined, and this can be done without impairing the concurrency model. As used herein, the TXOs are sometimes referred to as "mutable."

Figure 16:
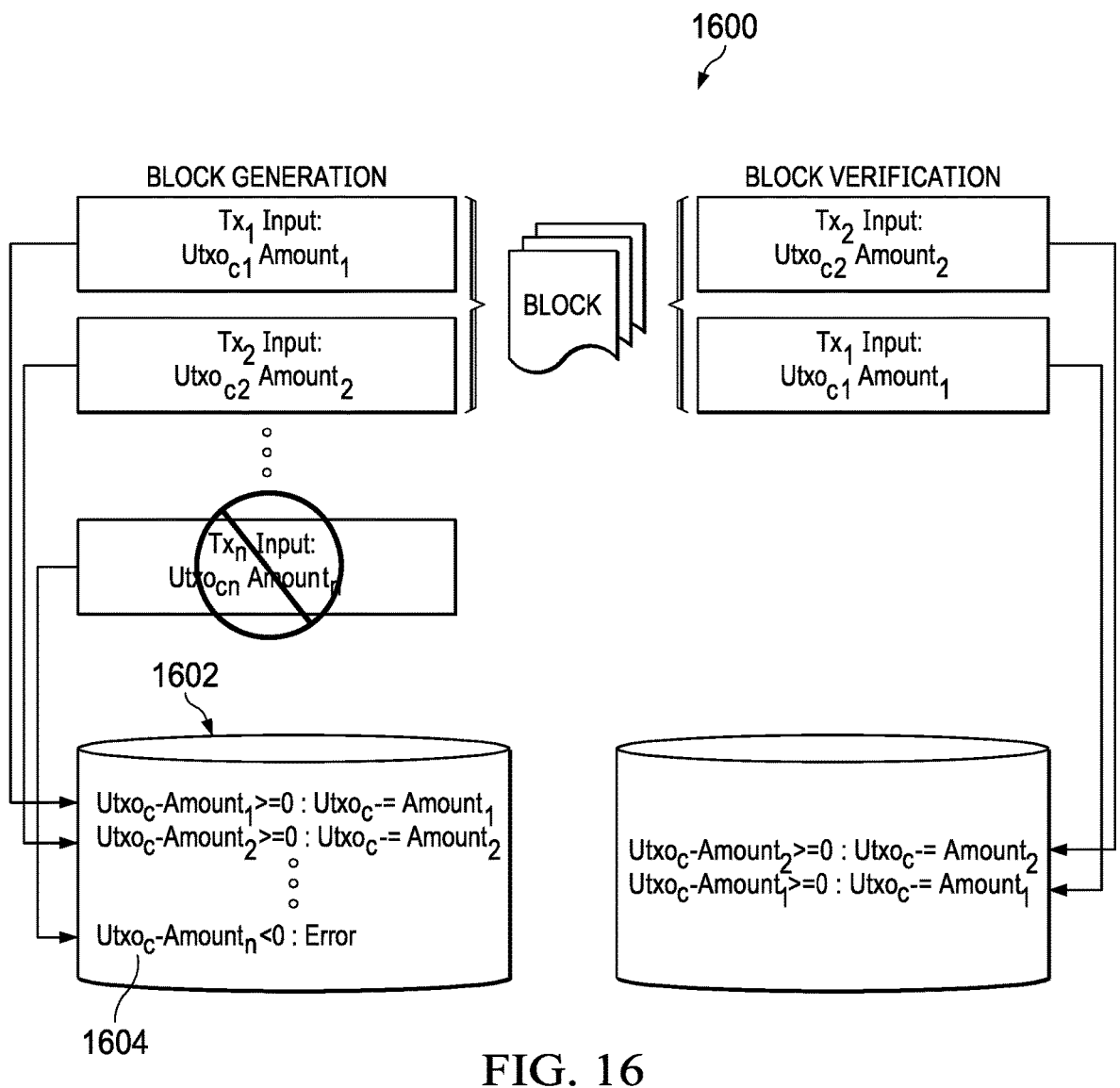
FIG. 16 depicts the use of mutable TXOs.

FIG. 16 depicts an example scenario, wherein mutable TXOs are used to impose a limit on the movement of value. In the example, $Utxo_C$ represents the limit to be imposed, and it is given an initial value (for example, perhaps each day a new $Utxo_C$ is created with a value representing a daily limit). Transactions subject to that limit all attempt to subtract their value amount from $Utxo_C$. If that subtraction does not cause the value of $Utxo_C$ to become less than zero, the transaction succeeds and is included in the block 1600. During block generation some combination of transactions (e.g., 1602) that subtract value from $Utxo_C$ (out of potentially multiple possible combinations of such transactions considered for inclusion in the block) may succeed, whereas others (e.g., 1604) may fail and not be included in the block. As shown, this operation is commutative such that any combination that is included in the block will result in a block that verifies by other nodes regardless in what order the transactions are processed by the other nodes. And, the end value of $Utxo_C$ will be the same when the block processing is completed by all blockchain nodes. This is important because it means transactions can be safely processed concurrently across multiple transaction handlers and produce blocks that verify properly regardless of how the transactions are handled across how ever many handlers are used in verifying nodes.

More generally, a mutable TXO such as described can move in either direction so long as it does not move in both directions within the same blockchain block generation. Or more formally, any combination of operations performed on any type of data is permissible so long as all possible subsets of a set of transactions comprising a block are also valid. In other words, if the actions taken during a block are commutative, then they can safely be processed in any order without delay.

Thus, according to this disclosure, the system may be configured to define a TXO to represent a limit that is decreased upon each use. When the TXO value is exhausted, transactions using the limit will fail. By decreasing by one (decrementing) the value, a counting limit is realized. By decreasing by some other value, a value limit is realized. By increasing a value, a count or aggregate value is realized. This feature may be used in conjunction with edge-triggered and deferred actions described below, e.g., to set, reset or otherwise mutate values in non-commutative ways. As a further variant, it is possible to allow value in a mutable TXO to move in both directions within a block by defining deterministic ordering and synchronization semantics.

Edge-Triggered Actions

An issue that arises with the generalized TXO concept is the need to change attributes or reset limits and counts. These actions are often non-commutative with respect to the primary use of the value. As these are generally infrequent operations, and according to another aspect herein, the system also is configured to provide the ability to set or reset these data via a blockchain transaction such that in the block the transaction is assigned the previous values are available and that in the immediate next block (a descendant block) the new values are available. These types of changes are called edge-triggered because unlike traditional UTXOs that come into existence when the processing of a block is complete. Thus, for example, here the TXOs already exist and their value in a block is unaffected by the edge triggered action during the processing of the block; the actions only take effect after the current block processing is complete, but before the next descendent block processing begins. The change in value takes effect (is triggered) after the end of a block or before the start of the next.

Figure 17:
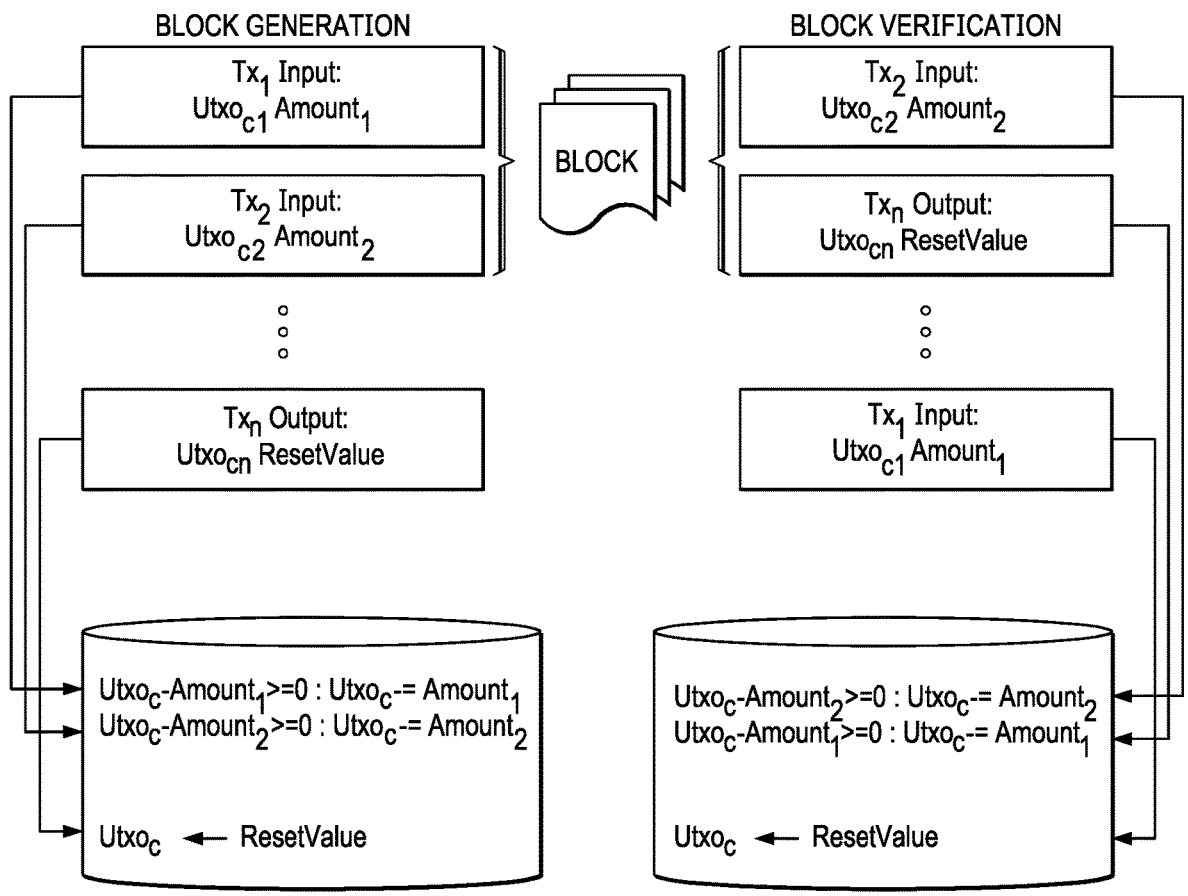
FIG. 17 depicts the use of edge-triggered TXOs.

Referring to FIG. 17, here the edge-triggered handling of a limit reset is shown. The edge triggering typically is the last thing that happens in the handling of a block, such that logically it is happening between the currently shown block and the next. Because of this, the order in which the reset is processed does not matter, because both the generating node and verifying nodes all impart the same edge triggered semantic and thus only after this block is complete, is the value of $Utxo_C$ set to ResetValue. Thus, the ResetValue will have no effect on $Tx_1$ or $Tx_2$ during generation or validation. Again, the resulting value of $Utxo_C$ will be the same.

It should be appreciated that if the client or multiple clients reset the limit to different values at the same time, the result upon block completion must be independent of the order in which the transactions performing the resets were processed. For many use cases, it is sufficient to reject or defer (see the next section) transactions that collide in mutating a TXO. In other use cases, it will be better to impose a deterministic ordering of the edge triggered actions in the TXO handlers. This isolates any sorting to be within a given handler and only applied to those edge triggered actions that have collided in a given block.

Advantageously, the edge-triggered action can be applied to create an effective instruction execution pipeline, whereby each blockchain transaction represents an instruction and the blocks represent execution fences such that the execution in one block is fenced off from (cannot be reordered with) executions in other blocks. Using this primitive, one can construct arbitrarily sophisticated business logic comprised of related blockchain transactions spanning multiple blocks. Thus, the use of edge-triggered actions not only increase what can be done within a single transaction, they provide a more general framework for executing related and interrelated flows of transactions.

Deferred Transactions

Edge-triggered action achieves immediate non-commutative actions of a TXO without disrupting or delaying other actions. Given the block generation rate the system is designed to achieve, it may be preferable to perform the action during the processing of a block, but to defer conflicting actions to future blocks. Conceptually, this can be thought of as automatically setting a typed lock on the value that expires at the end of the block. Once the lock is held, conflicting actions fail, but the handling of that failure can be to try again in some future block thus turning the failure into a wait.

Figure 18:
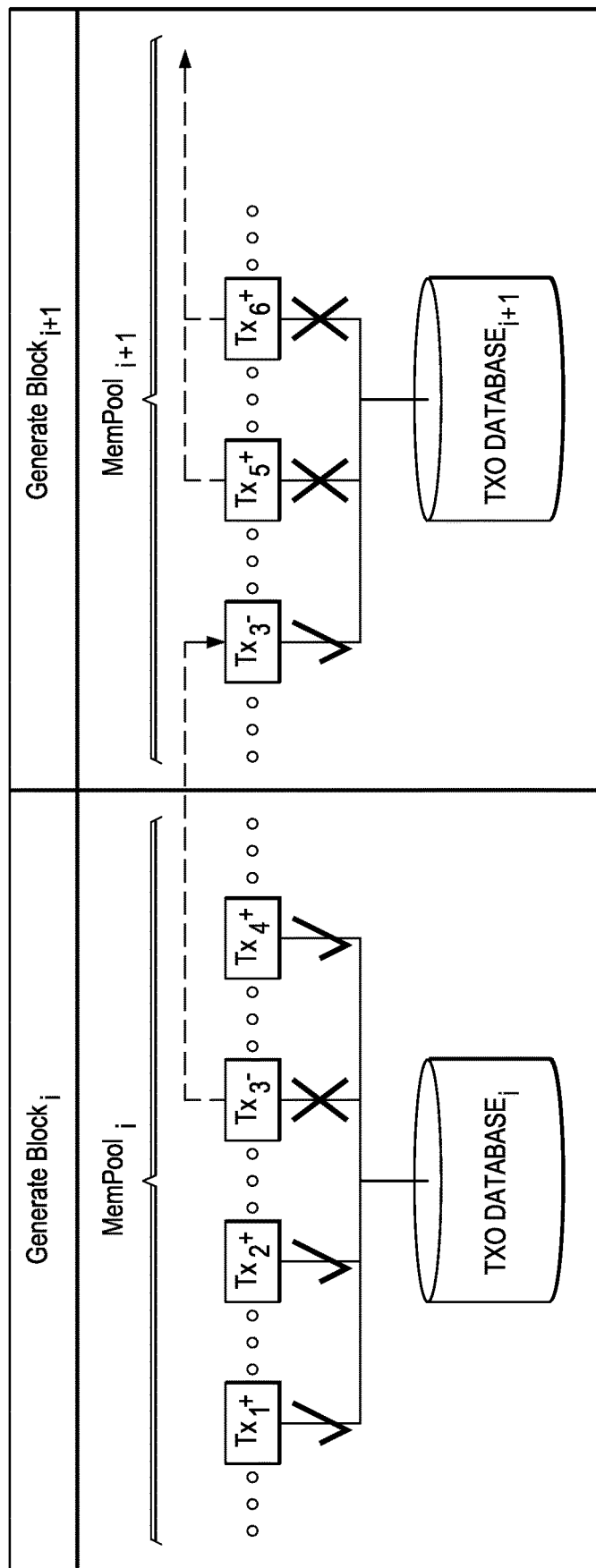
FIG. 18 depicts how TXOs may be used for transaction deferment according to a further aspect.

FIG. 18 depicts the notion of deferred transactions. In particular, and while generating $Block_i$, two transactions ($Tx_1+$ and $Tx_2+$) that increase the value of a given TXO are shown as being processed from the generator's mempool. These do not conflict with one another and are processed successfully. The third transaction ($Tx_3-$), however, decreases the value of the same TXO and the operation is not commutative with the previously successful increases. Consequently, $Tx_3-$ initially fails, but is left in mempool and its processing is deferred to a future block. If mempool is organized as a FIFO, then it is likely that the deferred transaction will get processed successfully in the next block. This is not a guarantee, but it statistically avoids starvation issues. As also depicted, transaction $Tx_4+$ also is successful because it does not conflict with other successful operations in the same block. During the next block ($Block_{i+1}$), in this example, $Tx_3-$ is now successfully processed, but $Tx_5+$ and $Tx_6+$ conflict with $Tx_3-$ and are deferred to the next block, and so forth.

An example application of this design is to consume value from TXOs dispersed across a multitude of consumers, but to accumulate that value in a single TXO that represents a merchant. From time to time, the client (a bank administrator, for example) may want to clear or settle value from the merchant's account. While not a frequent operation, it the removal of value cannot be safely performed at the same time as value is being accumulated. Deferring the decrease to the next block and deferring from that next block block conflicting increases, a distributed client need not coordinate the actions, thereby increasing overall system throughput and response time even though some individual actions are being delayed. This particular application is advantageous because it the number of TXOs would tend to remain stable during payment operations. Further, if there is a big or active merchant, the use of deferred transactions as described herein reduces TXO churn and increases memory cache hits.

It should be appreciated that the operations are not limited to addition or subtraction and the values are not required to be numeric.

Enabling Technologies

Figure 9:
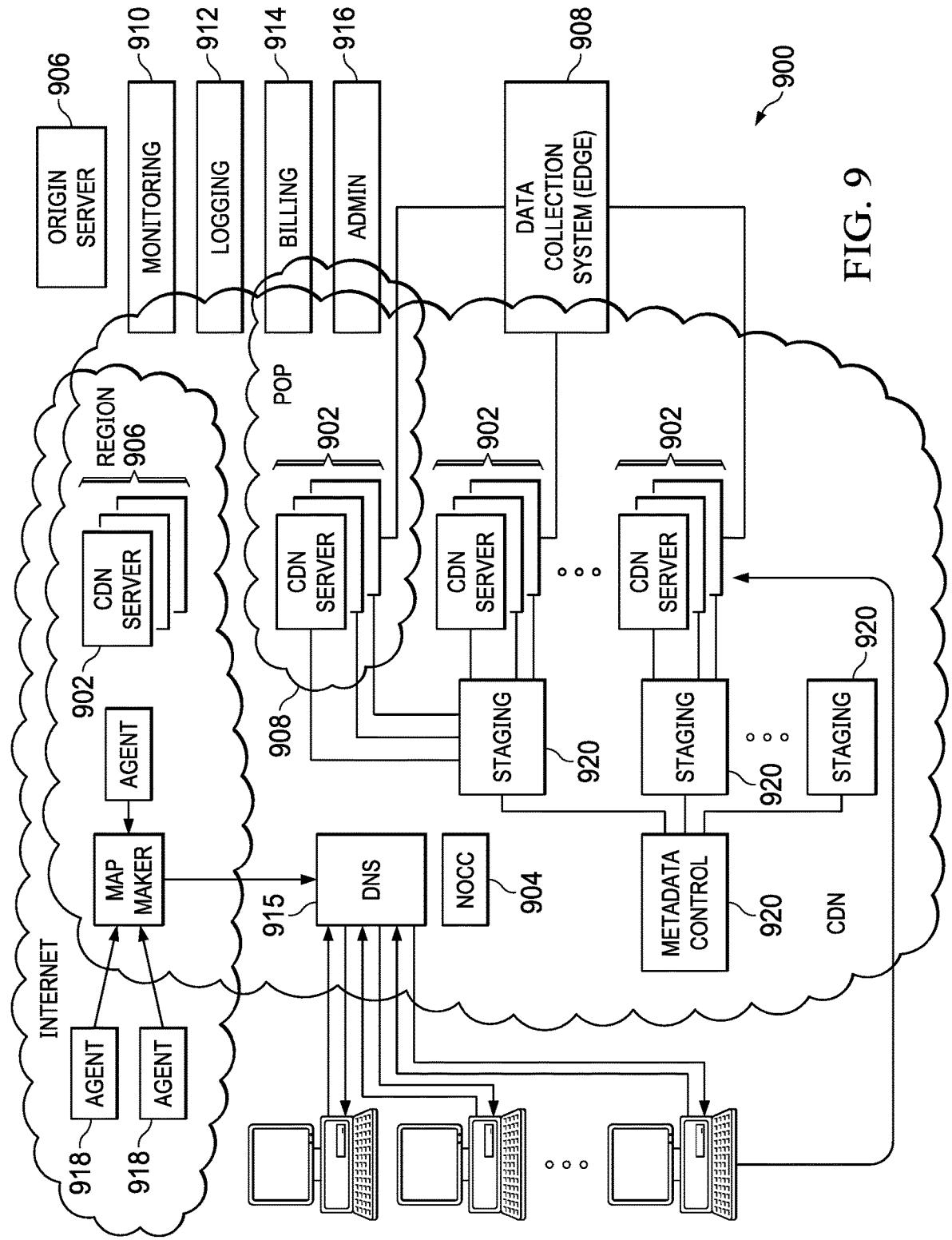
FIG. 9 depicts a content delivery network (CDN) architecture that may be associated with the computing network fabric.

As noted above, the techniques of this disclosure may be implemented within the context of an overlay network, such as a content delivery network (CDN), although this is not a limitation. In a known system of this type, such as shown in FIG. 9, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 10:
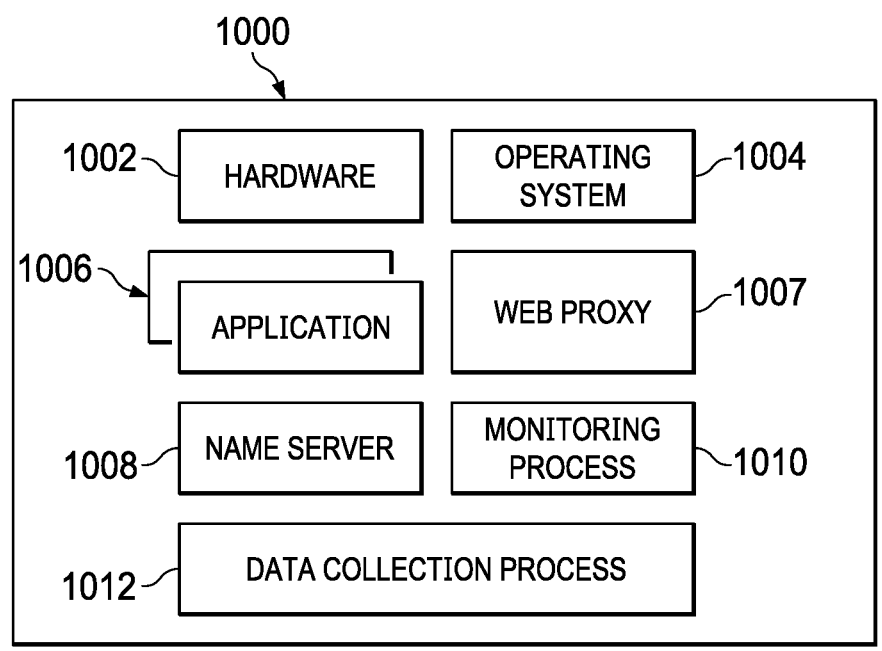
FIG. 10 depicts a representative machine configuration.

As illustrated in FIG. 10, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. The approach described there is sometimes referred to as an SSL-protected edge network. In a typical operating scenario, secure content delivery enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras, providing a key management service, and the like. In one embodiment here, wallet services may be located in front of or behind an SSL-protected edge network.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

The above-described client-to-edge server mapping technique may be used to associate a wallet or wallet service (the "client") with an edge server. In a typical use case, a transaction initiated from or otherwise associated with that wallet or wallet service then passes through the edge server and onward to the core for further processing as described herein. As noted above, the wallet or wallet service (or some portion thereof) may also reside inside the edge, such that wallet requests pass through the edge to the wallet or wallet service and onward to the core. Some portion of the transaction processing may be carried out at the edge server.

Each above-described process preferably is implemented in computer software as a set. of program instructions executable in one or more processors, as a special-purpose machine.

Representative machines on which the subject matter herein is provided may be Intel hardware processor-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields.

Each above-described process preferably is implemented in computer software as a set of program instructions executable in one or more processors, as a special-purpose machine.

The edge network may communicate with the core using various technologies. Representative overlay network technologies that may be leveraged include those described in U.S. Publication Nos. 2015/0188943 and 2017/0195161, the disclosures of which are incorporated herein by reference. Among other things, these publications describe the CDN resources being used facilitate wide area network (WAN) acceleration services over the overlay in general, as well as between enterprise data centers (which may be privately-managed) and third party software-as-a-service (SaaS) providers. In one typical scenario, a so-called routing overlay leverages existing content delivery network (CDN) infrastructure to provide significant performance enhancements for any application that uses Internet Protocol (IP) as a transport protocol by routing around down links or finding a path with a smallest latency. Another approach is to provide messages from the edge to the core using multicast, unicast, broadcast or other packet-forwarding techniques.

The techniques herein generally provide for the above-described improvements to a technology or technical field, as well as the specific technological improvements to various fields including distributed networking, distributed transaction processing, wide area network-accessible transaction processing systems, high performance, low latency

What is claimed is as follows:

1. A method operative in association with a set of transaction handling computing elements that comprise a network core that receive and process transaction requests into an append-only immutable chain of data blocks, wherein a data block is a collection of transactions, and wherein an Unspent Transaction Output (UTXO) data structure supporting the immutable chain of data blocks is an output from a finalized transaction, the UTXO data structure consisting essentially of an address and a value, the method comprising:

configuring at least one UTXO data structure to include information either in addition to or in lieu of the address and value, thereby defining a mutable Transaction Output (TXO), wherein the mutable TXO has a value; and executing the set of transaction handling computing elements to concurrently process a set of transactions into a data block of the immutable chain of data blocks, wherein during processing the mutable TXO value is available for use by at least first and second transactions in the set;

wherein when the first and second transactions do not conflict with one another the mutable TXO value is adjusted;

wherein when the first and second transactions do conflict with one another, at least one of the first and second transactions is failed;

wherein the first and second transactions conflict with one another when the mutable TXO value for the first transaction increases while the mutable TXO value for the second transaction decreases, and an operation associated with the second transaction is not commutative to an operation associated with the first transaction.

2. The method as described in claim 1 wherein either the first or second transaction has associated therewith a count or aggregate value.

3. The method as described in claim 1 wherein the first transaction and the second transaction comprise a related set of transactions as defined by business logic.

4. The method as described 1 further including maintaining the failed first or second transaction for processing in another data block.

5. The method as described in claim 4 wherein the failed first or second transaction is maintained in a memory pool.

6. The method as described in claim 4 wherein the failed first or second transaction is processed in a next block of the chain of data blocks.

7. The method as described in claim 1 further including deferring the failed first or second transaction.

8. The method as described in claim 7 further including processing the deferred first or second transaction in a new data block of the immutable chain of data blocks.

9. The method as described in claim 1 wherein the first and second transactions are associated with first and second consumers that are distinct from one another.

10. The method as described in claim 9 wherein the mutable TXO value is associated with a merchant.

11. The method as described in claim 1 wherein the append-only immutable chain of data blocks is a blockchain.

12. The method as described in claim 1 wherein the first or second transaction is associated with an edge-triggered action.

13. The method as described in claim 1 wherein each of the first and second transactions are associated with business logic spanning the data block, and at least one other data block.

14. A method operative in association with a set of transaction handling computing elements that comprise a network core that receive and process transaction requests into an append-only immutable chain of data blocks, and wherein an Unspent Transaction Output (UTXO) data structure supporting the immutable chain of data blocks is an output from a finalized transaction, the method comprising:

configuring a mutable Transaction Output (TXO);

concurrently processing a set of transactions into a data block of the immutable chain of data blocks, wherein during processing the mutable TXO value is available for use by at least first and second transactions in the set;

determining whether the first and second transactions collide with one another, wherein the first and second transactions collide with one another when the mutable TXO value for the first transaction increases while the mutable TXO value for the second transaction decreases, and an operation associated with the second transaction is not commutative to an operation associated with the first transaction; and upon determining that the first and second transactions collide with one another, failing least one of the first and second transactions.

15. The method as described in claim 14 further including deferring processing of the failed first or second transaction.

16. The method as described in claim 15 further including processing the deferred first or second transaction in a new data block of the immutable chain of data blocks.

17. The method as described in claim 14 wherein the first transaction and the second transaction comprise a related set of transactions as defined by business logic.

18. The method as described in claim 14 wherein the first and second transactions are associated with first and second consumers that are distinct from one another.

19. The method as described in claim 18 wherein the mutable TXO value is associated with a merchant.

* * * * *